US012771480B2

(12) United States Patent
Xu et al.

(10) Patent No.: US 12,771,480 B2
(45) Date of Patent: Oct. 20, 2026

(54) INFORMATION INDICATION METHOD, NETWORK DEVICE, TERMINAL, CHIP, AND STORAGE MEDIUM

(71) Applicant: GUANGDONG OPPO MOBILE TELECOMMUNICATIONS CORP., LTD., Dongguan (CN)

(72) Inventors: Weijie Xu, Dongguan (CN); Zhisong Zuo, Dongguan (CN); Zhi Zhang, Dongguan (CN)

(73) Assignee: GUANGDONG OPPO MOBILE TELECOMMUNICATIONS CORP., LTD, Dongguan (CN)

( * ) Notice: Subject to any disclaimer, the term of this patent is extended or adjusted under 35 U.S.C. 154(b) by 0 days.

(21) Appl. No.: 18/629,241

(22) Filed: Apr. 8, 2024

(65) Prior Publication Data

US 2024/0259137 A1 Aug. 1, 2024

Related U.S. Application Data

(63) Continuation of application No. PCT/CN2021/124216, filed on Oct. 15, 2021.

(51) Int. Cl.
*H04L 1/1607* (2023.01)
*H04L 5/00* (2006.01)

(52) U.S. Cl.
CPC .......... *H04L 1/1607* (2013.01); *H04L 5/0055* (2013.01)

(58) Field of Classification Search
None
See application file for complete search history.

(56) References Cited

U.S. PATENT DOCUMENTS

| | | | | |
|---|---|---|---|---|
| 2011/0051824 | A1 | 3/2011 | Kim | |
| 2012/0218882 | A1 | 8/2012 | Ko et al. | |
| 2013/0021898 | A1 | 1/2013 | Kang et al. | |
| 2015/0207592 | A1 | 7/2015 | Lee | |
| 2016/0198453 | A1* | 7/2016 | Hu | H04L 1/1822 370/349 |
| 2017/0288817 | A1 | 10/2017 | Cao | |
| 2018/0176939 | A1* | 6/2018 | Guan | H04B 7/0626 |

(Continued)

FOREIGN PATENT DOCUMENTS

| | | | |
|---|---|---|---|
| CN | 109314910 | A | 2/2019 |
| CN | 110830151 | A | 2/2020 |
| CN | 112544044 | A | 3/2021 |

OTHER PUBLICATIONS

S.-Y. Lien et al., "3GPP NR Sidelink Transmissions Toward 5G V2X," in IEEE Access, vol. 8, pp. 35368-35382, 2020 (Year: 2020).*
International Search Report in the international application No. PCT/CN2021/124216, mailed on Jul. 18, 2022. 7 pages with English translation.

(Continued)

*Primary Examiner* — Daniel F. McMahon
(74) *Attorney, Agent, or Firm* — Ladas & Parry LLP

(57) ABSTRACT

There are provided an information indication method, a network device, a terminal, a chip, a computer-readable storage medium, and a communication system. The method includes that: a network device sends a first signaling including respective feedback information corresponding to each resource unit in a first resource set, here, the feedback information indicates whether the network device correctly received data from a terminal based on the resource unit corresponding to the feedback information.

20 Claims, 16 Drawing Sheets

(56) References Cited

U.S. PATENT DOCUMENTS

| | | | | |
|---|---|---|---|---|
| 2019/0036655 | A1 | 1/2019 | Cao | |
| 2019/0132868 | A1* | 5/2019 | Lin | H04L 5/0055 |
| 2019/0379489 | A1 | 12/2019 | Hwang et al. | |
| 2020/0052825 | A1 | 2/2020 | Sarkis | |
| 2020/0177322 | A1* | 6/2020 | Xu | H04L 1/1819 |
| 2021/0014011 | A1* | 1/2021 | Xiong | H04L 1/1887 |
| 2021/0159948 | A1 | 5/2021 | Li | |
| 2021/0266133 | A1* | 8/2021 | Zhang | H04L 1/1861 |
| 2022/0264612 | A1* | 8/2022 | Yang | H04L 5/0053 |
| 2023/0224931 | A1* | 7/2023 | Kim | H04W 56/002<br>370/329 |
| 2023/0299929 | A1* | 9/2023 | Gou | H04L 5/0055<br>370/329 |

OTHER PUBLICATIONS

Written Opinion of the International Search Authority in the international application No. PCT/CN2021/124216, mailed on Jul. 18, 2022. 6 pages with English translation.

3GPP TSG-SA WG1 Meeting #94e S1-211120, Electronic Meeting, May 10-20, 2021 (revision of S1-21xxxx), Source: OPPO, Title: New SID: Study on Wireless Power Sourcing enabled Communication Services in 5GS, Document for: Approval, Agenda Item: 4. section 3. 3 pages.

3GPP TSG RAN Rel-18 workshop RWS-210453, Electronic Meeting, Jun. 28-Jul. 2, 2021, Source: Huawei, HiSilicon, Title: Passive IoT for 5G Advanced, Agenda item: 4.2, Document for: Discussion and decision. section 2. 5 pages.

Supplementary European Search Report for European application No. 21960325.5, mailed on Feb. 27, 2025, 7 pages.

* cited by examiner

INFORMATION INDICATION METHOD, NETWORK DEVICE, TERMINAL, CHIP, AND STORAGE MEDIUM

CROSS-REFERENCE TO RELATED APPLICATION(S)

This application is a continuation of International Patent Application No. PCT/CN2021/124216 filed on Oct. 15, 2021, the entire contents of which are incorporated by reference herein in its entirety.

BACKGROUND

Due to significant advantages such as extremely low cost, zero-power consumption and small size, zero-power communication based on power harvesting and back scattering technology may be widely used in all walks of life, such as logistics, intelligent warehousing, smart agriculture, energy and power, industrial Internet, and the like for vertical industries; and may also be applied to personal applications such as smart wearable devices and smart homes.

In many zero-power communication scenarios, the number of zero-power terminals communicating with a network device is large. For example, in a logistics scenario, the network device needs to read the information of hundreds or thousands of zero-power terminals in a short time (such as a few seconds). How to accurately complete the communication with a large number of zero-power terminals is a problem to be solved.

SUMMARY

Embodiments of the present disclosure relates to the field of communications and provide an information indication method, a network device, a terminal, a chip, a non-transitory computer-readable storage medium, and a communication system.

In a first aspect, an embodiment of the present disclosure provides a information indication method, which includes the following operations.

A network device sends a first signaling including respective feedback information corresponding to each resource unit in a first resource set.

Herein, the feedback information indicates whether the network device correctly received, based on the resource unit corresponding to the feedback information, data transmitted by a terminal.

In a second aspect, an embodiment of the present disclosure provides a information indication method, which includes the following operations.

A terminal receives a first signaling including respective feedback information corresponding to each resource unit in a first resource set.

Herein, the feedback information indicates whether a network device correctly received, based on a resource unit corresponding to the feedback information, data transmitted by the terminal.

In a third aspect, an embodiment of the present disclosure provides a network device, which includes: a transceiver; a processor; and a memory for storing a computer program that, when executed by the processor, causes the processor to send, through the transceiver, a first signaling including respective feedback information corresponding to each resource unit in a first resource set. Herein, the feedback information indicates whether the network device correctly received, based on the resource unit corresponding to the feedback information, data transmitted by a terminal.

In a fourth aspect, an embodiment of the present disclosure provides a terminal, which includes: a transceiver; a processor; and a memory for storing a computer program that, when executed by the processor, causes the processor to receive, through the transceiver, a first signaling including respective feedback information corresponding to each resource unit in a first resource set. Herein, the feedback information indicates whether a network device correctly received, based on a resource unit corresponding to the feedback information, data transmitted by the terminal.

In a fifth aspect, an embodiment of the present disclosure further provides a chip, which includes a processor configured to invoke and run a computer program stored in a memory to cause a network device on which the chip is installed to send a first signaling including respective feedback information corresponding to each resource unit in a first resource set. Herein, the feedback information indicates whether the network device correctly received, based on the resource unit corresponding to the feedback information, data transmitted by a terminal.

In a sixth aspect, an embodiment of the present disclosure further provides a chip, which includes a processor configured to invoke and run a computer program stored in a memory to cause a terminal on which the chip is installed to receive a first signaling including respective feedback information corresponding to each resource unit in a first resource set. Herein, the feedback information indicates whether a network device correctly received, based on a resource unit corresponding to the feedback information, data transmitted by the terminal.

In a seventh aspect, an embodiment of the present disclosure further provides a non-transitory computer-readable storage medium for storing a computer program that, when executed by a network device, causes the network device to send a first signaling including respective feedback information corresponding to each resource unit in a first resource set. Herein, the feedback information indicates whether the network device correctly received, based on the resource unit corresponding to the feedback information, data transmitted by a terminal.

In an eighth aspect, an embodiment of the present disclosure further provides a non-transitory computer-readable storage medium for storing a computer program that, when executed by a terminal, causes the terminal to receive a first signaling including respective feedback information corresponding to each resource unit in a first resource set. Herein, the feedback information indicates whether a network device correctly received, based on a resource unit corresponding to the feedback information, data transmitted by the terminal.

In a ninth aspect, an embodiment of the present disclosure provides a communication system, which includes a terminal configured to receive a first signaling including respective feedback information corresponding to each resource unit in a first resource set; and a network device configured to send the first signaling including the respective feedback information corresponding to each resource unit in the first resource set. Herein, the feedback information indicates whether the network device correctly received, based on a resource unit corresponding to the feedback information, data transmitted by the terminal.

DETAILED DESCRIPTION

Figure 1:
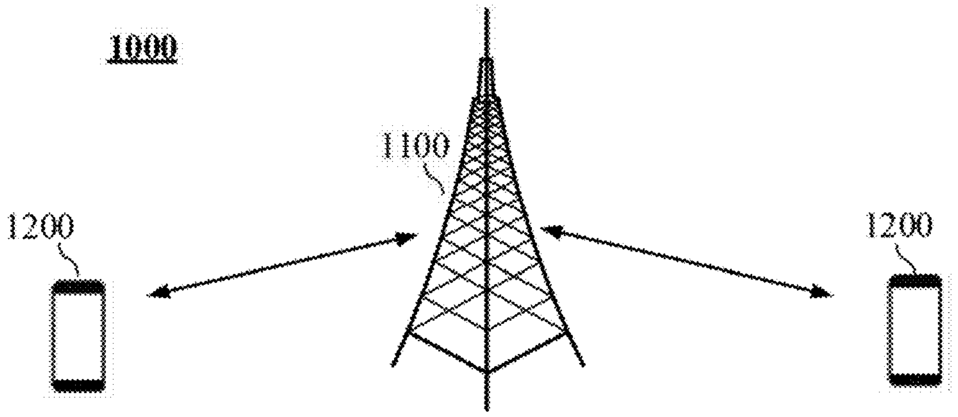
FIG. 1 is a diagram of architecture of an exemplary communication system.

The technical solutions of embodiments of the present disclosure will be described in conjunction with the accompanying drawings in embodiments of the present disclosure below.

It should be understood that the terms "system" and "network" may often be used interchangeably in the present disclosure. The term "and/or" in the present disclosure is used to describe association relationships of associated objects, for example, it represents that there may be three types of relationships between previous and next associated objects. For example, A and/or B may represent three situations: i.e., independent existence of A, existence of both A and B and independent existence of B. Character "/" in the present disclosure usually represents that previous and next associated objects form an "or" relationship.

It should be understood that the reference to "indication" in embodiments of the present disclosure may be a direct indication, or may be an indirect indication, or may be indicative of an association. For example, A indicates B, which can mean that A directly indicates B, for example, B can be obtained through A. It can also mean that A indirectly indicates B, for example, A indicates C, and B can be obtained through C. It can also mean that there is an association between A and B.

In the description of embodiments of the present disclosure, the term "correspondence" may mean that there is a direct correspondence or an indirect correspondence relationship between the two, or may mean that there is an association relationship between the two, or may be a relationship between indication and being indicated, configuration and being configured, or the like.

Generally, communication systems may include: global system of mobile communication (GSM) system, code division multiple access (CDMA) system, wideband code division multiple access (WCDMA) system, general packet radio service (GPRS), long term evolution (LTE) system, advanced long term evolution (LTE-A) system, new radio (NR) system, evolution system of NR system, LTE-based access to unlicensed spectrum (LTE-U) system, NR-based access to unlicensed spectrum (NR-U) system, non-terrestrial networks (NTN) system, universal mobile telecommunication system (UMTS), wireless local area networks (WLAN), wireless fidelity (Wi-Fi), 5th-Generation (5G) system or other communication systems, or the like.

Traditional communication systems support a limited number of connections and are easy to implement. However, with the development of communication technology, mobile communication systems will not only support traditional communication, but also support, for example, device to device (D2D) communication, machine to machine (M2M) communication, machine type communication (MTC), vehicle to vehicle (V2V) communication, or vehicle to everything (V2X) communication, or the like.

Communication systems may be applied to a carrier aggregation (CA) scenario, a dual connectivity (DC) scenario, or a standalone (SA) network deployment scenario.

Communication systems generally include a network device and a terminal device. Herein, the terminal device may also be referred to as a user equipment (UE), an access terminal, a user unit, a user station, a mobile station, a remote station, a remote terminal, a mobile device, a user terminal, a terminal, a wireless communication device, a user agent, or a user device, or the like.

The terminal device may be a STATION (ST) in a WLAN, a cellular telephone, a cordless telephone, a session initiation protocol (SIP) telephone, a wireless local loop (WLL) station, a personal digital assistant (PDA) device, a handheld device with wireless communication function, a computing device or other processing devices connected to a wireless modem, a vehicle-mounted device, a wearable device, a terminal device in a next generation communication system such as an NR network, or a terminal device in a future evolved public land mobile network (PLMN) network, or the like.

The terminal device may be deployed on land, including indoor or outdoor, hand-held, wearable or vehicle-mounted; or may be deployed on the water (such as ships); or may be deployed in the air (such as airplanes, balloons and satellites).

The terminal device may be a mobile phone, a tablet computer, a computer with wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, or a wireless terminal device in smart home or the like.

By way of example and not limitation, the terminal device may also be a wearable device. The wearable device may also be referred to as a wearable intelligent device, which is a general name of wearable devices developed through the application of wearable technologies for intelligent design of daily wear, such as glasses, gloves, watches, clothing and shoes. The wearable device is a portable device that is worn directly on the body or integrated into the user's clothes or accessories. The wearable device is not only a hardware device, but also realizes powerful functions through software support, data interaction and cloud interaction. Generalized wearable intelligent devices include devices with full functions and large sizes, which may realize complete or partial functions without relying on smart phones, such as smart watches or smart glasses, and includes devices that only focus on certain application functions and need to be used in conjunction with other devices (such as smart phones), such as various smart bracelets and smart jewelry for monitoring physical signs.

The network device may be a device for communicating with a mobile device. The network device may be an access point (AP) in a WLAN, a base transceiver station (BTS) in a GSM or CDMA, a NodeB (NB) in a WCDMA, an evolved node B (eNB or eNodeB) in a LTE, a relay station or an AP, a vehicle-mounted device, a wearable device, a network device (gNB) in an NR network, or a network device in a future evolved PLMN network, or the like.

The network device may have mobility characteristics, for example, the network device may be a mobile device. In an example, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, and the like. In an example, the network device may also be a base station set on land, water and the like.

The network device may provide services for a cell, and the terminal device communicates with the network device through the transmission resources (e.g., frequency domain resources, or spectrum resources) used by the cell. The cell may be a cell corresponding to the network device (e.g., a base station), and the cell may belong to a macro base station or a base station corresponding to a small cell. The small cell herein may include a metro cell, a micro cell, a pico cell, a femto cell, and/or the like. These small cells have the characteristics of small coverage and low transmit power, and are suitable for providing high-speed data transmission services.

FIG. 1 exemplarily illustrates a wireless communication system 1000, which includes one network device 1100 and two terminal devices 1200. In an example, the wireless communication system 1000 may include multiple network devices 1100, and other numbers of terminal devices may be included within the coverage area of each network device 1100, which is not limited by embodiments of the present disclosure.

It should be understood that a device with a communication function in a network/system in the embodiments of the present disclosure may be referred to as a communication device. Taking the communication system illustrated in FIG. 1 as an example, the communication device may include a network device and a terminal device with communication functions, and the network device and the terminal device may be specific devices in embodiments of the present disclosure, which will not be repeated here. The communication device may also include other devices in the communication system, such as a network controller, a mobility management entity and other network entities, which are not limited by embodiments of the present disclosure.

In order to facilitate understanding of the technical solution of embodiments of the present disclosure, the related technologies of embodiments of the present disclosure will be explained below. The following related technologies as exemplary solutions may be arbitrarily combined with the technical solutions of embodiments of the present disclosure, and the solutions obtained through any combination belong to the protection scope of embodiments of the present disclosure.

(I) The Technical Principle of Zero-Power Communication

Figure 2:
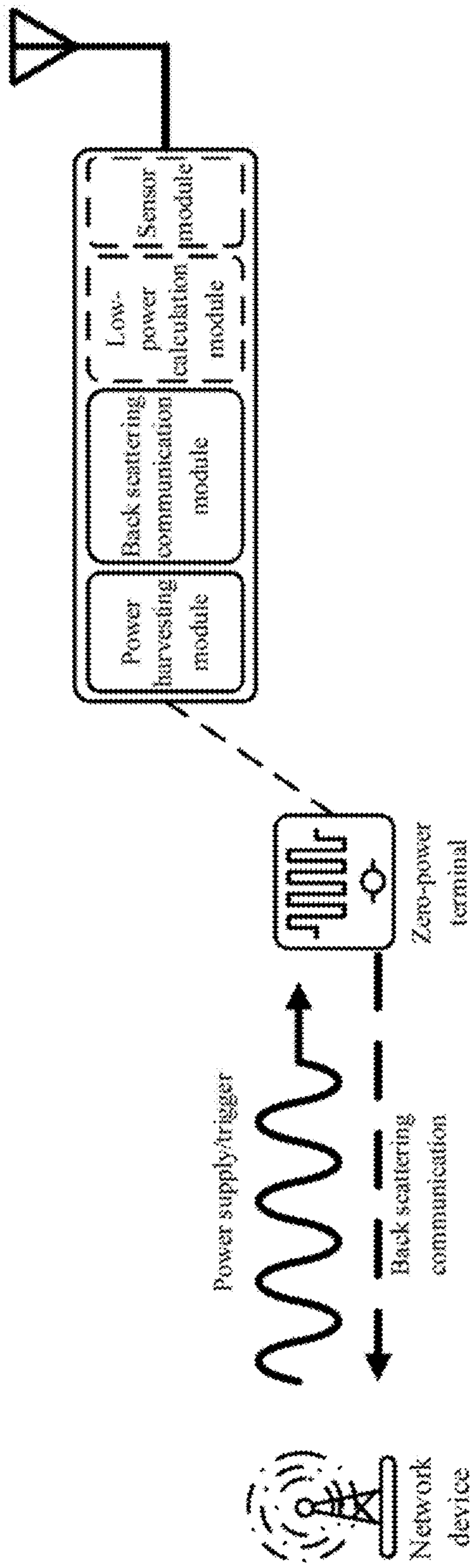
FIG. 2 is a diagram of a zero-power communication system according to an embodiment of the present disclosure.

Power harvesting and back scattering communication technologies are adopted for zero-power communication. As illustrated in FIG. 2, a zero-power communication network includes a network device and a zero-power terminal. Herein, the network device is used to send a radio power supply signal and a downlink communication signal to the zero-power terminal, and to receive a back scattering signal from the zero-power terminal. A basic zero-power terminal contains a power harvesting module such as a RF power harvesting module, a back scattering communication module and a low-power calculation module. In an example, the zero-power terminal may also have a memory for storing some basic information (such as item identification) or sensor(s) for acquiring sensing data such as ambient temperature and ambient humidity.

The key technologies of zero-power communication mainly include RF power harvesting and back scattering communication.

1. RF Power Harvesting

Figure 3:
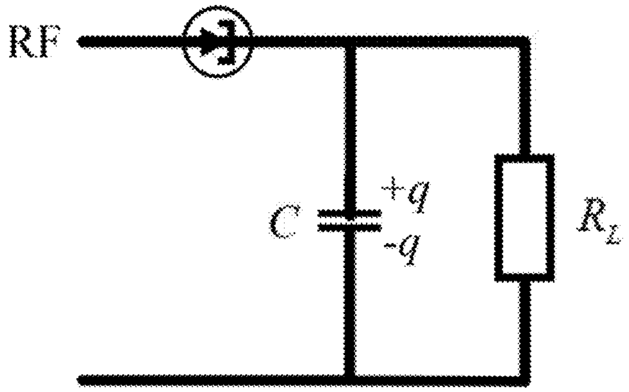
FIG. 3 is a diagram of radio frequency power harvesting according to an embodiment of the present disclosure.

As illustrated in FIG. 3, a RF power harvesting module realizes the harvesting of space electromagnetic wave power according to the principle of electromagnetic induction, and then obtains the power required for driving operation of the zero-power terminal. Exemplarily, the power may be used to drive low-power demodulation and modulation modules, sensors and memory reading, and the like. Therefore, the zero-power terminal does not need a conventional battery.

2. Back Scattering Communication

Figure 4:
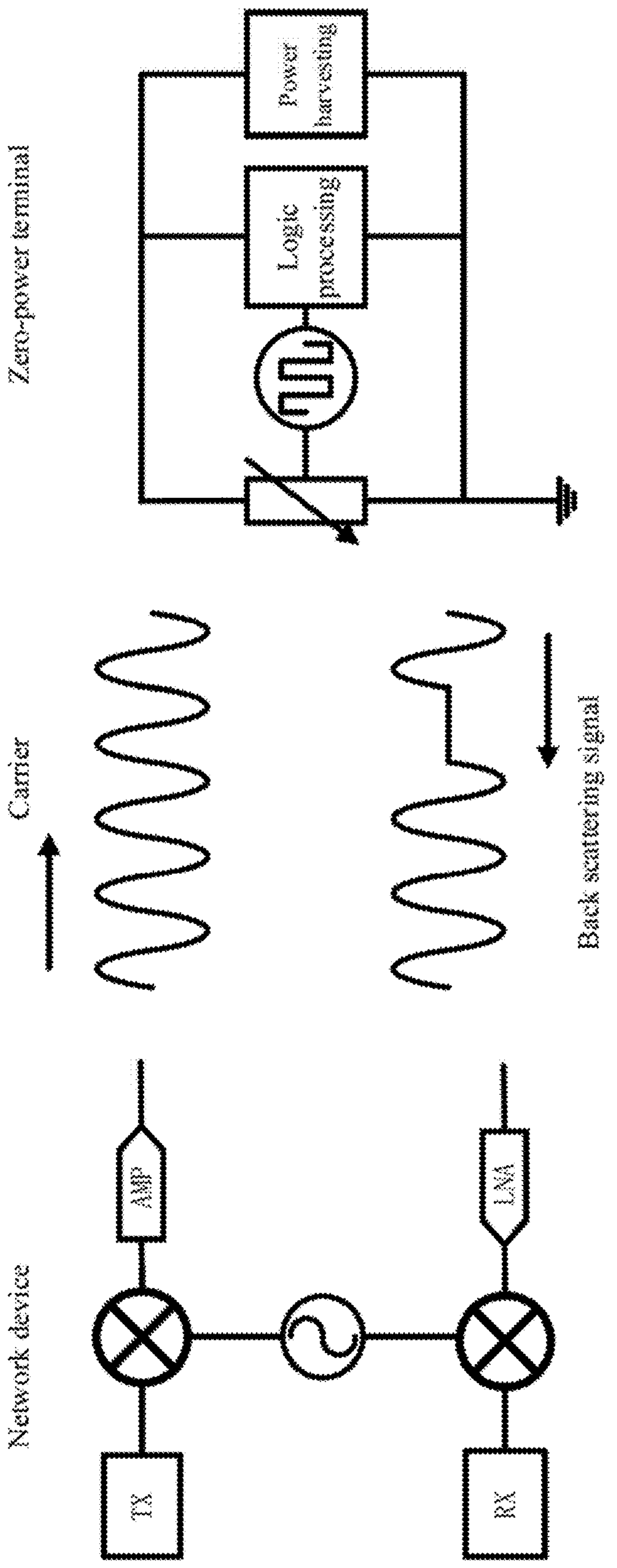
FIG. 4 is a diagram of back scattering communication according to an embodiment of the present disclosure.

As illustrated in FIG. 4, the zero-power terminal receives a radio signal (carrier) sent by the network device and modulates the radio signal to load information to be sent on the radio signal, and then radiates the modulated signal (a back scattering signal) from an antenna. This process of information transmission is referred to as back scattering communication. Back scattering and load modulation functions are inseparable. By adjusting and controlling the circuit parameters of the oscillation loop of the zero-power terminal based on the beat of the data stream, the load modulation makes the parameters such as the impedance of the zero-power terminal (e.g., electronic tag) change accordingly, thus completing the process of modulation.

Figure 5:
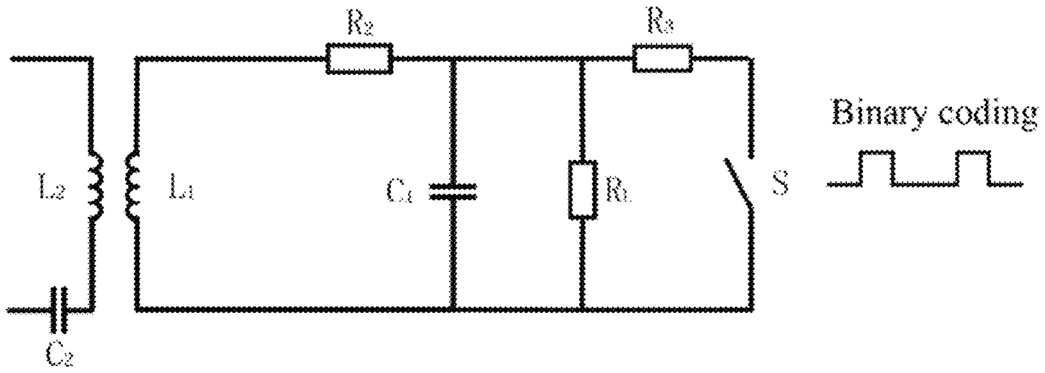
FIG. 5 is a diagram of resistance load modulation according to an embodiment of the present disclosure.

Load modulation technology mainly includes two methods which include resistance load modulation and capacitance load modulation. In resistance load modulation, as illustrated in FIG. 5, a load is connected in parallel to a resistor. Switch S is turned on or off based on the control of binary data stream, thus turning on or off the resistor. On-off of the resistor will cause the change in the circuit voltage, so amplitude shift keying (ASK) is realized, that is, the modulation and transmission of the signal are realized by adjusting the amplitude of the back scattering signal of the zero-power terminal. Similarly, in capacitance load modulation, the change in the resonant frequency of the circuit may be achieved by on-off of a capacitor, and frequency shift keying (FSK) is realized, that is, the modulation and transmission of the signal are realized by adjusting the working frequency of the back scattering signal of the zero-power terminal.

It can be seen that the zero-power terminal performs information modulation on the incoming signal by means of load modulation, thus realizing the process of back scattering communication. Therefore, the zero-power terminal has significant advantages as follows.

(1) The terminal does not actively transmit signals, so there is no need for complex RF links, such as a power amplifier (PA) and a RF filter.

(2) The terminal does not need to actively generate high-frequency signals, so there is no need for high-frequency crystal oscillators.

(3) By means of back scattering communication, the terminal does not need to consume its own power for signal transmission.

(II) The Application Scenario of Zero-Power Communication

Due to significant advantages such as extremely low cost, zero-power consumption and small size, the zero-power communication may be widely used in all walks of life, including logistics, intelligent warehousing, smart agriculture, energy and power, and industrial Internet, and the like for vertical industries; and may also be applied to personal applications such as smart wearable devices and smart homes.

(III) The Coding Methods for Zero-Power Communication

The data transmitted by the zero-power terminal (e.g., electronic tag) may be represented as binary "1" and "0" in different forms of codes. Taking a radio frequency identification (RFID) device/system as an example, one of the following coding methods can usually be used: non return zero (NRZ) inverted coding, Manchester coding, Unipolar RZ coding, differential bi-phase (DBP) coding, Miller coding, differential coding. Generally speaking, different pulse signals are used to represent 0 and 1.

1. NRZ Inverted Coding

Figure 6A:
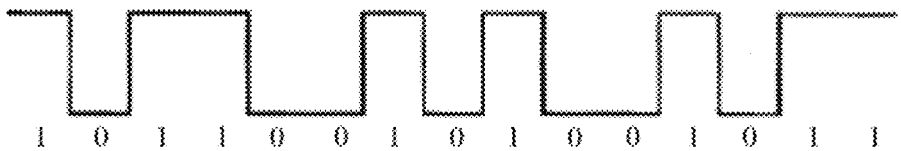
FIG. 6A is a diagram of non return zero inverted coding according to an embodiment of the present disclosure.

For NRZ inverted coding, use of a high level to represent binary "1" and use of a low level to represent binary "0", as illustrated in FIG. 6A.

2. Manchester Coding

Figure 6B:
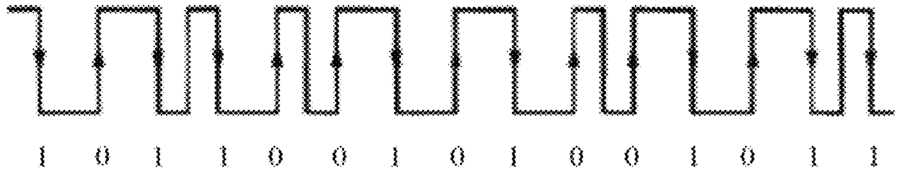
FIG. 6B is a diagram of Manchester coding according to an embodiment of the present disclosure.

Manchester coding is also referred to as split-phase coding. In Manchester coding, a value of a bit is represented by the change (rising/falling) of a level at half a bit period of the bit length. A negative jump (falling) at half a bit period represents binary "1" and a positive jump (rising) at half a bit period represents binary "0", as illustrated in FIG. 6B. When Manchester coding is applied to load modulation or back scattering modulation of carriers, it is usually used in scenarios of data transmission from an electronic tag to a reader, because it is beneficial for detecting errors in the data transmission. This is because a state of "no change" is not allowed within the bit length. When the data bits sent by multiple electronic tags simultaneously have different values, the received rising edge and the falling edge cancel each other, resulting in an uninterrupted carrier signal in the whole bit length. Since this state is not allowed, the reader may determine the specific position where a collision occurs by using this error.

3. Unipolar RZ Coding

Figure 6C:
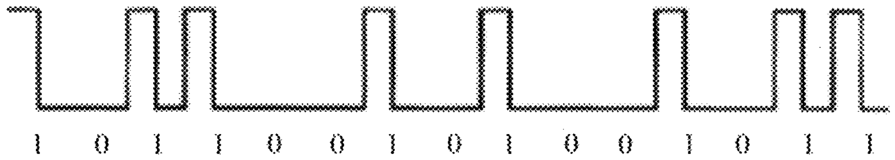
FIG. 6C is a diagram of unipolar return zero coding according to an embodiment of the present disclosure.

For unipolar RZ coding, a high level in a first half-bit period represents binary "1", while a low level signal lasting the whole bit period represents binary "0", as illustrated in FIG. 6C. Unipolar RZ coding may be used to extract bit synchronization signals.

4. DBP Coding

Figure 6D:
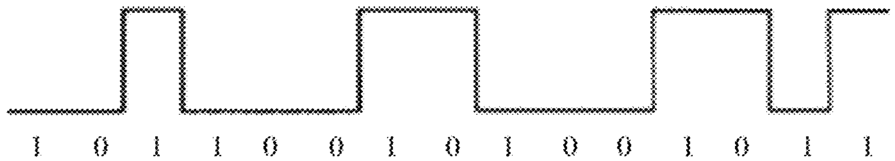
FIG. 6D is a diagram of differential bi-phase coding according to an embodiment of the present disclosure.

For DBP coding, any edge in a half-bit period represents binary "0", while no edge represents binary "1", as illustrated in FIG. 6D. In addition, at the beginning of each bit period, the level is inverted. Therefore, it is easier for the receiver to reconstruct the bit beat.

5. Miller Coding

Figure 6E:
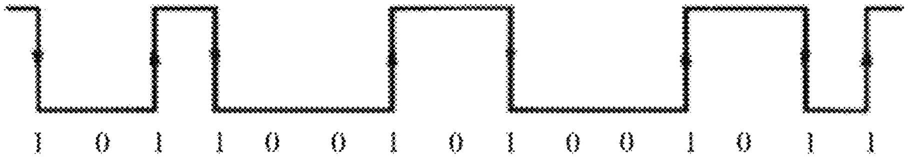
FIG. 6E is a diagram of Miller coding according to an embodiment of the present disclosure.

For Miller coding, any edge within a half-bit period represents binary "1", while a constant level over the next bit period represents binary "0". Level alternating occurs at the beginning of the bit period, as illustrated in FIG. 6E. Therefore, it is easier for the receiver to reconstruct the bit beat.

6. Differential Coding

In differential coding, each binary "1" to be transmitted causes a change in the signal level, while for binary "0", the signal level remains unchanged.

(IV) Classification of Zero-Power Terminals

Based on power sources and usages of zero-power terminals, the zero-power terminals may be divided into the following types.

1. Passive Zero-Power Terminal

The passive zero-power terminal does not need a built-in battery. When the zero-power terminal approaches the network device (such as a reader of the RFID system), the zero-power terminal is in a near-field range formed by the antenna radiation of the network device. Therefore, an antenna of the zero-power terminal generates an induced current through electromagnetic induction, and the induced current drives the low-power chip circuit of the zero-power terminal, so as to realize operations such as signal demodulation for a forward link and signal modulation for a backward link. For the back scattering link, the zero-power terminal uses the back scattering implementation for signal transmission.

It can be seen that no matter for the forward link or the backward link, the passive zero-power terminal does not need the built-in battery for driving, so it is a zero-power terminal in the true sense.

Since the passive zero-power consumption terminal does not need batteries, and the RF circuit and baseband circuit are very simple, such as not requiring devices such as low-noise amplifier (LNA), PA, crystal oscillator, analog to digital converter (ADC), so it has many advantages such as small size, light weight, cheap price and long service life.

2. Semi-Passive Zero-Power Terminal

The semi-passive zero-power terminal is also not equipped with conventional batteries, but may harvest radio wave power using the RF power harvesting module and store the harvested power in a power storage unit (such as capacitor). After the power storage unit obtains power, it may drive the low-power chip circuit of the zero-power terminal, to realize operations such as signal demodulation for a forward link and signal modulation for a backward link. For the back scattering link, the zero-power terminal uses the back scattering implementation for signal transmission.

It can be seen that no matter for the forward link or the backward link, the semi-passive zero-power terminal does not need the built-in battery for driving. Although the power stored in the capacitor is used in the work, the power comes from the radio power harvested by the power harvesting module, so it is also a zero-power terminal in the true sense.

The semi-passive zero-power terminal inherits many advantages of the passive zero-power terminal, so it has many advantages such as small size, light weight, cheap price and long service life.

3. Active Zero-Power Terminal

The zero-power terminal used in some scenarios may also be an active zero-power terminal, and such a terminal may have a built-in battery. The battery is used to drive the low-power chip circuit of the zero-power terminal to realize operations such as signal demodulation for a forward link and signal modulation for a backward link. However, for the back scattering link, the zero-power terminal uses the back scattering implementation for signal transmission. Therefore, the zero-power of this kind of terminal is mainly reflected in the fact that signal transmission on the reverse link does not need to consume the power of the terminal itself, but uses the back scattering implementation.

The active zero-power terminal has the built-in battery to supply power to a RFID chip, which may increase the reading and writing distance of the tag and improve the reliability of communication. Therefore, the active zero-power terminal can be applied in some scenarios with relatively high requirements on communication distance and reading delay.

(V) Cellular Passive Internet of Things

With the increasing applications in 5G industry, there are more and more types of connections and application scenarios, and there will be higher requirements for the cost and power consumption of the communication terminals. The application of battery-free and low-cost passive Internet of Things devices has become the key technology of cellular Internet of Things, which enriches the types and number of 5G network link terminals and truly realizes the interconnection of everything. Herein, a passive Internet of Things device may be based on zero-power communication technology, such as RFID technology, and extended on this basis to be suitable for cellular Internet of Things.

(VI) Resource Configuration Method for Zero-Power Communication

In some application scenarios of zero-power communication, such as logistics scenarios, there is a need for many terminals to communicate with the network in a short time. If the control and coordination of resources are not well done for the zero-power terminals, then in case that many terminals send information to the network at the same time, it may cause serious terminal collision and signal interference, resulting in that the network cannot correctly demodulate the information sent by terminals. Even in some solutions, the resource coordination is performed by means of the random fallback of terminals, but it may still cause many terminals to choose the same time-frequency resources for fallback, which causes serious collision and mutual interference problems. Based on this, embodiments of the present disclosure provides a resource configuration method, which is used to configure resources for a reverse link (UL link) in zero-power communication, namely, the resources are used for the zero-power terminal to perform back scattering communication, aiming at solving the interference and collision problems in a process of the zero-power communication.

1. Resource Configuration

Figure 7:
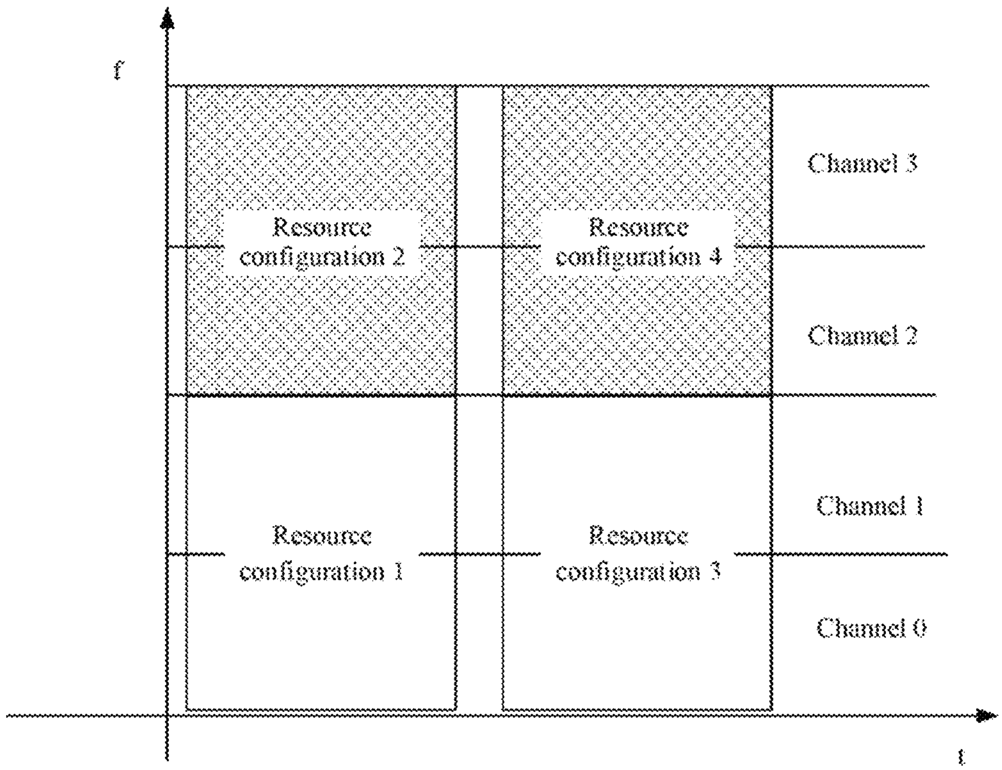
FIG. 7 is a structural diagram of resource configuration according to an embodiment of the present disclosure.

A network node sends signaling to a zero-power terminal, and the signaling is used to send resource configuration information to the zero-power terminal, i.e., indicating resource configuration. Herein, the signaling includes at least one (i.e., one or more) resource configuration information. As illustrated in FIG. 7, the network sends, to the terminal, four types of resource configuration information indicating resource configuration 1, resource configuration 2, resource configuration 3 and resource configuration 4, respectively.

Each resource configuration information is used to configure resources for zero-power communication. The configured resources are in units of resource units, and a resource set formed by multiple resource units may be configured by each configuration information. Herein, each resource unit is taken as a minimum time-frequency resource when a zero-power terminal performs communication.

Herein, the resource configuration information indicates at least one of the following information A to I.

A. Time Domain Length of the Resource Unit.

Figure 8:
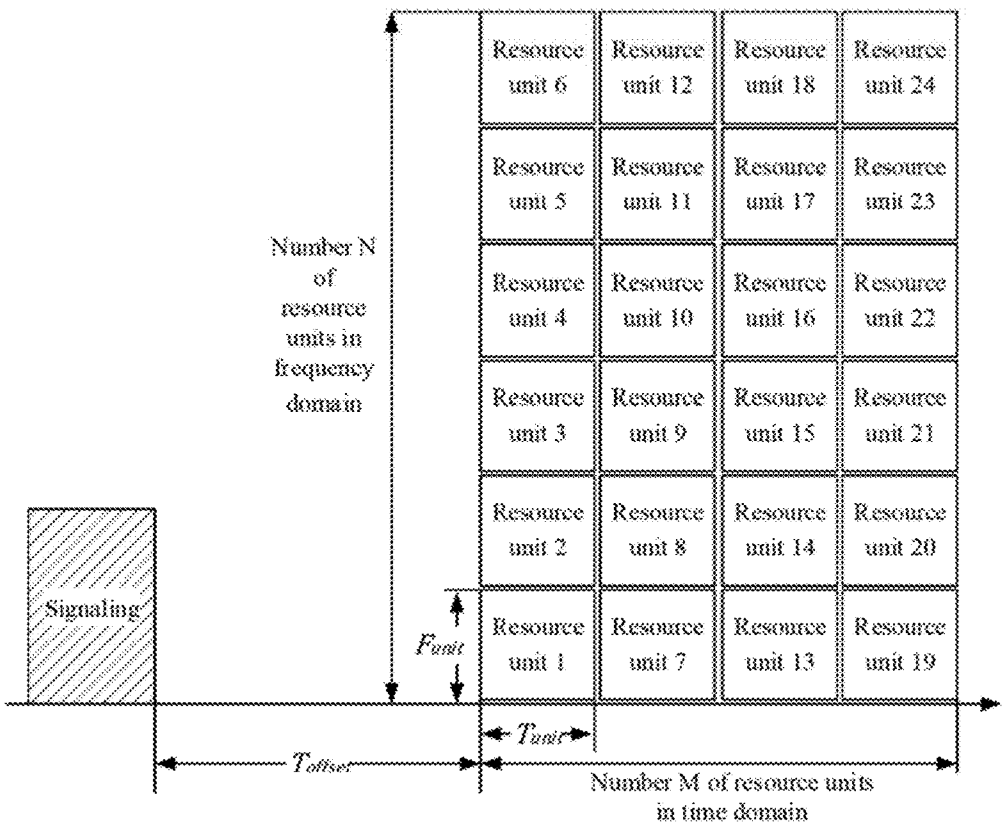
FIG. 8 is a structural diagram of resource units according to an embodiment of the present disclosure.

Referring to FIG. 8, a resource set configured by resource configuration information may include resource unit 1 to resource unit 24. The resource configuration information may indicate the time domain length of each resource unit, such as $T_{unit}$ in FIG. 8. The units of the time domain length are microseconds (us), milliseconds (ms), symbols, or slots. That is, the time domain length may be represented in microseconds, milliseconds, the number of symbols occupied, or the number of slots occupied.

B. Frequency Resource Configuration of the Resource Unit.

This information is used to describe the frequency domain width of the resource unit, that is, bandwidth, as $F_{unit}$ illustrated in FIG. 8. For example, the bandwidth information may include the number of PRBs occupied and/or the bandwidth size.

C. Quantity Configuration of the Resource Unit in Time Domain.

This information refers to the number of resource units configured in the time domain in each resource configuration, such as the number M of resources in the time domain as illustrated in FIG. 8.

Generally speaking, multiple resource units may be continuously distributed in time domain, which is beneficial to improve resource utilization efficiency. In practical applications, multiple resource units may also be discontinuously distributed in time domain. If the multiple resource units are discontinuous in time domain, the network may further configure distribution characteristics of the multiple resource units in time domain, such as a distribution pattern.

D. Quantity Configuration of the Resource Unit in Frequency Domain.

This information refers to the number of resource units configured in frequency domain, such as the number N of resources in frequency domain as illustrated in FIG. 8.

Generally speaking, multiple resource units may be continuously distributed in frequency domain, which is beneficial to improve resource utilization efficiency. In practical applications, multiple resource units may also be discontinuously distributed in frequency domain. If the multiple resource units are discontinuous in frequency domain, the network may further configure distribution characteristics of the multiple resource units in frequency domain, such as a distribution pattern.

E. Location Configuration of the Resource Unit in Time Domain.

This information refers to the location information of the resource unit in time domain. It may be the relative location of the resource unit relative to the signaling (configuration information or scheduling signaling), as $T_{offset}$ illustrated in FIG. 8, or it may be the absolute location information of the resource unit in time domain.

If the configured resource set contains multiple resource units in time domain, the locations of all resource units in time domain may be determined based on one of the multiple resource units. For example, a location of an earliest resource unit in time among multiple resource units contained in the resource set is first determined, and based on this, locations of other resource units are further determined (e.g., based on the number of resource units in time domain or their distribution characteristics). Therefore, the location information of resource units in time domain contained in the signaling may be absolute time location information of the earliest resource unit in time among the configured resource units or a time interval of the earliest resource unit relative to the signaling.

F. Location Configuration of the Resource Unit in Frequency Domain.

This information refers to the location information of the resource unit in frequency domain. It may be a frequency location offset of the resource unit relative to the signaling (configuration information or scheduling signaling), or may be a serial number of a PRB occupied by the resource unit in frequency domain, or an index of a channel occupied, or the like.

If the configured resource set contains multiple resource units in frequency domain, locations of all resource units in frequency domain may be determined based on one of the multiple resource units. For example, a location of a resource unit occupying the lowest frequency location in frequency domain among multiple resource units contained in the resource set is first determined, and based on this, locations of other resource units are further determined (e.g., based on the number of resource units in frequency domain or their distribution characteristics). Therefore, the location information of resource units in frequency domain contained in the signaling may be the frequency location occupied by the resource unit occupying the lowest frequency location in frequency domain among multiple resource units, such as the serial number of the PRB occupied, or the index of the channel occupied, or the frequency location offset relationship relative to the channel where the configuration signaling is.

G. Information of Orthogonal Code or Non-Orthogonal Code Used on the Resource Unit.

If the orthogonal code or non-orthogonal code is further used on the same resource unit, the set of available resources may be expanded, thereby potentially reducing collisions among users and improving the correct probability of transmission. For example, even if two users choose resource units that are completely overlapping in time domain and frequency domain, if the two users choose different codewords, the network device may still correctly receive the information from the two users at the same time.

Information of the orthogonal code or non-orthogonal code contained in the resource configuration information may include at least one of: code length, the number of available codewords, or indexes of available codewords.

H. The Transmission Attributes Such as the Transmission Rate or Data Block Size Corresponding to the Resource Unit.

Different resources may be configured for terminals with different channel conditions, so the resource configuration information may contain the transmission rate, data block size (transport block size, TBS), or the modulation and coding scheme (MCS) or the like corresponding to the resource unit.

The terminal may select the corresponding resource unit according to its own channel conditions. For example, a terminal with a better channel condition, such as a terminal with a higher signal to noise ratio (SNR) or a higher reference signal receiving power (RSRP), may select a resource unit corresponding to a higher transmission rate (or corresponding to a larger TBS).

I. Terminal Classification Information Corresponding to the Resource Unit.

Different resource units may correspond to different types of terminals. For example, terminals with different priorities may correspond to different resource units, so the resource configuration information may contain priority information of a corresponding terminal. The terminal may select the corresponding resource unit based on its own priority.

It should be pointed out that part or all parameters of resource units (such as time domain lengths of resource units, frequency domain configurations of resource units, or transmission rates corresponding to resource units) corresponding to different resource configurations are different.

2. Resource Configuration Signaling

For signaling of resource configuration, one method is that the above configuration information may be transmitted through system information. The advantage is that the system information may carry relatively more configuration information and may be broadcast to all users in a cell. However, for the zero-power communication terminal, since the terminal itself does not use a battery, even if the configuration information transmitted in the system information is received, the system information cannot be stored for a long time. Therefore, using the traditional system information transmitted periodically as the above signaling may cause the zero-power terminal to lose the configuration information in the system information at the moment when the radio power supply is lost.

Therefore, a preferred method is to send the resource configuration information to the terminal before the communication with the zero-power terminal.

Specifically, the following two manners may be considered.

Figure 9:
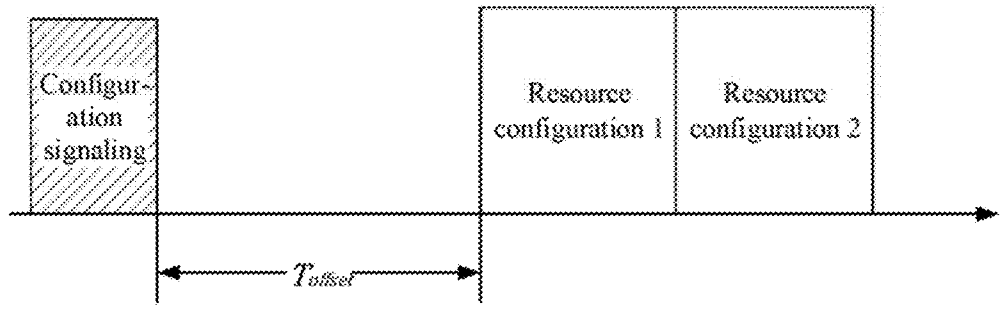
FIG. 9 is a structural diagram of configuration signaling according to an embodiment of the present disclosure.

Manner 1: the resource configuration information is sent when triggering the zero-power terminal to perform data transmission, that is, the configuration signaling carrying the resource configuration information is the signaling for triggering the terminal to transmit data, as illustrated in FIG. 9.

The terminal receives the resource configuration information and obtains one or more resource configurations indicated in the resource configuration information, where each resource configuration further configures information of the resource units as described above. The terminal selects a corresponding resource configuration based on its own situations, such as channel condition, service priority and other information, and further selects a resource unit from a resource set corresponding to the selected resource configuration to perform data transmission. Herein, if the resource set contains multiple resource units, the terminal may randomly select a resource unit. If each resource unit further contains multiple available codewords, the terminal randomly selects a codeword for data transmission.

Manner 2: the resource configuration information is sent in scheduling signaling for triggering the zero-power terminal to perform data transmission and configuration signaling. That is, the terminal receives the configuration signaling first and then receives the scheduling signaling.

Figure 10:
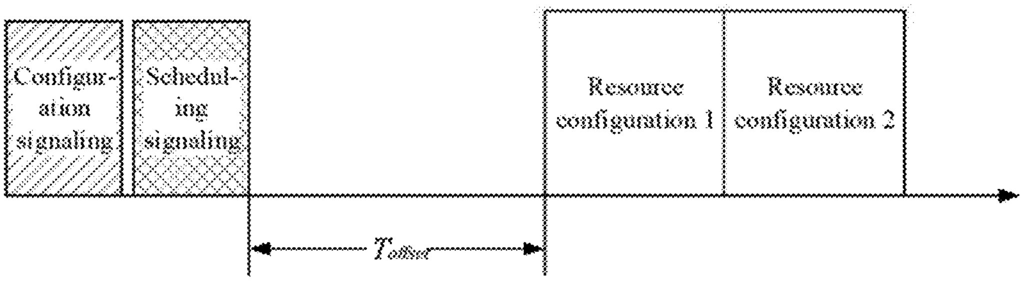
FIG. 10 is a first diagram of configuration signaling and scheduling signaling according to another embodiment of the present disclosure.

The terminal first receives the configuration signaling, and then the terminal receives the scheduling signaling. Herein, the configuration signaling may contain the time domain length, frequency resource configuration and the like of resource units; and the scheduling signaling may contain, for example, the $T_{offset}$ information in FIG. 10 or TBS block information (if such information is not contained in the resource configuration information) or the like. Through the combination of two kinds of signaling, not only the configuration signaling may be used to carry more configuration information, but also the flexible and variable characteristics of scheduling signaling may be brought into play, which improves the flexibility of scheduling.

Figure 11:
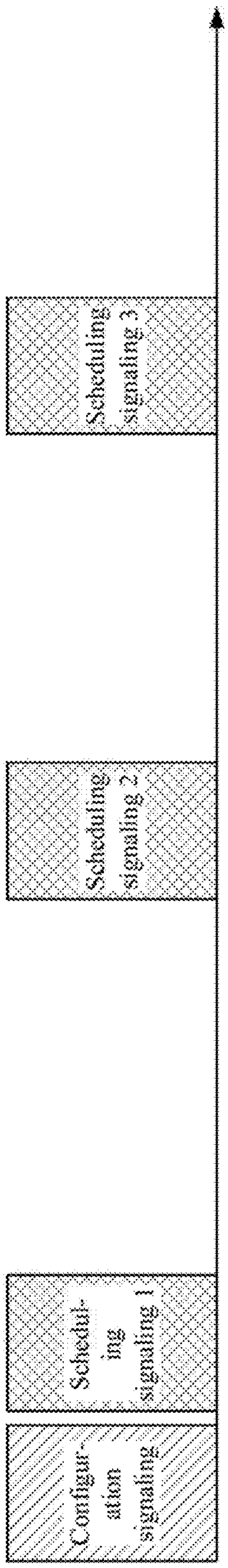
FIG. 11 is a second diagram of configuration signaling and scheduling signaling according to another embodiment of the present disclosure.
Figure 12:
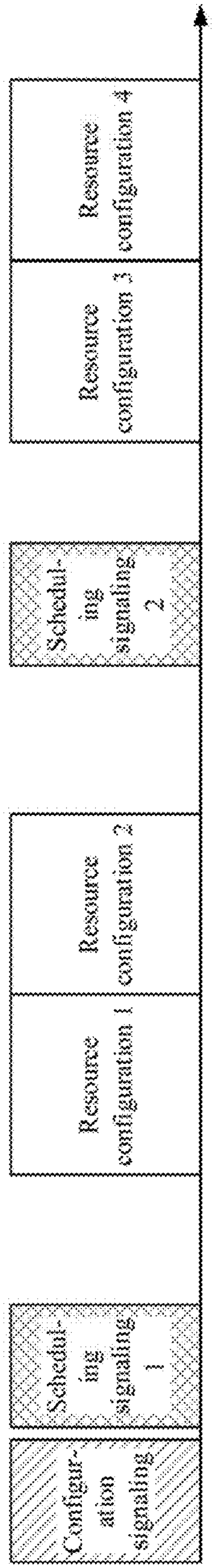
FIG. 12 is a third diagram of configuration signaling and scheduling signaling according to another embodiment of the present disclosure.

It should also be noted that one configuration signaling may be followed by multiple scheduling signaling at multiple time locations for performing multiple scheduling, as illustrated in FIG. 11. Herein, each scheduling signaling may indicate one or more resource configurations in conjunction with the configuration signaling, as illustrated in FIG. 12.

3. Access Control Signaling

When there are a large number of zero-power terminals, all terminals transmitting data together will lead to serious user collision. In order to solve this problem, access control method may be used to control the access of terminals, so that different terminals perform transmission sequentially in chronological order, thus alleviating or solving the collision problem and improving the transmission performance of the system.

For example, access control information may be indicated in the aforementioned resource configuration information or scheduling signaling, and the access control information may include one of the following (1) to (3).

(1) Access level of the terminal. Only terminals that meet the level requirements may transmit data. For example, the terminal access levels are divided into 5 levels which are 1, 2, 3, 4 and 5, respectively. If it is indicated that the terminal with access level 1 may be accessed, then only the terminal with access level 1 can transmit data, and other terminals cannot transmit data.

(2) Access probability. The access probability is the probability of controlling the terminals that can transmit data. For example, if the access probability is 20%, it means that only 20% of terminals may transmit data after receiving the aforementioned resource configuration information or scheduling signaling. The terminal randomly generates data within the interval [0, 1], and if it is greater than 0.2, the terminal cannot transmit data; otherwise, the terminal can transmit data.

(3) Terminal type. All terminals are classified into different types, such as monitor type, control type, tag type. Data can be transmitted only when it is indicated that the terminal with the corresponding type can transmit data.

The above method solves the resource allocation problem in case that there are a large number of zero-power terminals. However, on the other hand, the zero-power terminal determines that the data transmission is completed only when it is determined that the network correctly received the data from the terminal, otherwise, the terminal needs to retransmit the data. Therefore, how the network device perform the data reception feedback to the zero-power terminal is a problem that needs to be solved.

The solutions provided by embodiments of the present disclosure are mainly used to solve at least one of the above problems.

In order to enable more detailed understanding of the features and technical contents of embodiments of the present disclosure, the implementation of embodiments of the present disclosure will be described in detail below in conjunction with the accompanying drawings, which are provided for illustration only and are not intended to limit embodiments of the present disclosure.

Through in-depth research, the inventor of the present disclosure found that in the application of zero-power communication, the information sent by the terminal to the network will contain the UE identifier of the terminal. Therefore, embodiments of the present disclosure provides an information indication method, for the network device to perform data reception feedback to the terminal. In an example, the method may be applied to a zero-power communication system. The method includes the following operation.

The network device sends feedback information, herein, the feedback information includes UE identifier(s) corresponding to data correctly received by the network device.

That is, after correctly receiving information sent by the terminal, the network device may carry, in the feedback information, the identifier (ID) of the UE corresponding to the information correctly received, in order to inform the terminal whether the information is correctly received. For example, if the network device correctly received the data of a certain UE, the ID of the UE may be carried in the feedback information. For another example, if the network device correctly received the data of 20 UEs, the IDs of these 20 UEs may be carried in the feedback information.

Accordingly, the terminal receives the feedback information and determines, based on the UE identifier in the feedback information, whether the network device correctly received the data transmitted by the zero-power terminal. Specifically, when the feedback information contains the UE identifier of the terminal, the terminal determines that the network device correctly received the data transmitted by the terminal. When the feedback information does not contain the UE identifier of the terminal, the terminal determines that the network device did not correctly receive the data transmitted by the terminal, and the terminal needs to retransmit the data.

The above method is a highly feasible feedback method when there are a small number of terminals. However, in case that there are a large number of terminals, if the feedback information needs to carry the ID of each UE, it is apparent that the overhead of feedback will be relatively large or even unacceptable. For example, if there are 1000 UEs and the ID of each UE is assumed to be 40 bits, then the overhead of feedback is 40,000 bits. Such a large feedback overhead is unacceptable for zero-power communication with low data rate.

Another method for the network device to perform data reception feedback to the terminal provided by embodiments of the present disclosure includes the following operation.

The network device sends feedback information, herein, the feedback information includes compressed information of UE identifier(s) corresponding to data correctly received by the network device.

Herein, the compressed information may be partial information in the UE identifier(s), or may be information obtained by compressing the UE identifier(s) based on preset compression rules.

For example, the feedback information contains only part of all bits of the UE ID, such as the first M bits and/or the last N bits, where M and N are integers greater than or equal to 1. This method may alleviate the problem of large feedback overhead when the number of users is large to a certain extent, but it may also cause that for two or more UEs which are different from each other, the compressed UE IDs are the same, resulting in false feedback. This is also a problem required to be considered in the method of compressing the UE IDs.

Figure 13:
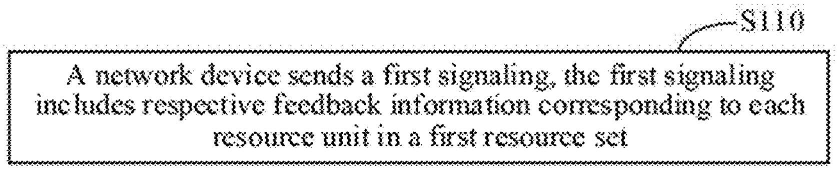
FIG. 13 is a flowchart of an information indication method according to an embodiment of the present disclosure.

As to the above problems, embodiments of the present disclosure also provide another information indication method. FIG. 13 is a schematic flowchart of an information indication method according to an embodiment of the present disclosure. The method includes the operation S110.

In S110, a network device sends a first signaling, the first signaling includes respective feedback information corresponding to each resource unit in a first resource set. Herein, the feedback information indicates whether the network device correctly received, based on the resource unit corresponding to the feedback information, data transmitted by a terminal.

In an example, the terminal may be a zero-power terminal. That is, the method may be applied to a zero-power communication system, but is not limited to this, and other terminals or communication systems may also adopt the method to perform data reception feedback, so as to achieve correct feedback and reduce overhead.

Exemplarily, the first resource set includes multiple resource units. Correspondingly, the first signaling may include multiple pieces of feedback information. Herein, the multiple resource units may be in one-to-one correspondences or one-to-many correspondences with the multiple pieces of feedback information. In other words, each resource unit may correspond to a piece of feedback information or may correspond to multiple pieces of feedback information.

It should be noted that the network device correctly received the data transmitted by the terminal, which means that the network device received the data transmitted by the terminal and can parse it correctly.

Figure 14:
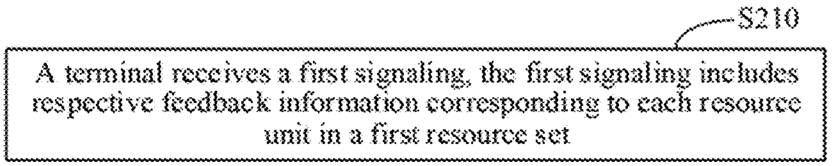
FIG. 14 is a flowchart of an information indication method according to another embodiment of the present disclosure.

According to the above method, the network device feeds back to the terminal whether the data transmitted on a resource unit is correctly received by carrying, in the first signaling, feedback information corresponding to the resource unit. Correspondingly, the terminal may receive the first signaling. Specifically, referring to FIG. 14, which is a schematic flowchart of an information indication method according to another embodiment of the present disclosure. The method includes the operation S210.

In S210, a terminal receives first signaling, the first signaling includes respective feedback information corresponding to each resource unit in a first resource set. Herein, the feedback information indicates whether a network device correctly received, based on the resource unit corresponding to the feedback information, data transmitted by the terminal.

In an example, the first resource set may be a resource set configured by the network device or pre-configured for the terminal to transmit data. Thus, each terminal selects a resource unit in the first resource set and transmits data based on the selected resource unit. Thereafter, by receiving the first signaling, the terminal may determine, based on the first signaling, whether the data is successfully received. Specifically, the above method further includes: when the terminal transmits data based on a first resource unit in the first resource set, the terminal determines whether the network device correctly received the data based on feedback information, corresponding to the first resource unit, in the first signaling.

In an example, the terminal may determine the feedback information, corresponding to the first resource unit, in the first signaling based on correspondences between each resource unit in the first resource set and each feedback information in the first signaling. Herein, the correspondences may be configured by the network device, or pre-configured, or determined by the terminal device based on a predefined rule or mapping order.

In an example, the feedback information may be acknowledgment information (ACK) or negative acknowledgement information (NACK). Herein, the acknowledgment information indicates that the network device correctly received data transmitted by the terminal based on the corresponding resource unit. The negative acknowledgment information indicates that the network device did not correctly receive data transmitted by the terminal based on the corresponding resource unit, e.g., did not receive data, or received the data but not correctly parse the data.

In an example, the acknowledgement information or the negative acknowledgement information may be represented by a bit value. Exemplarily, the feedback information is the acknowledgement information when the feedback information includes a first bit value. The feedback information is the negative acknowledgement information when the feedback information includes a second bit value. Herein, the first bit value is 1 and the second bit value is 0. Alternatively, the first bit value is 0 and the second bit value is 1.

In an example, the feedback information is a single bit, i.e., the feedback information is one bit information, which may be referred to as a feedback bit. Taking the first bit value being 1 and the second bit value being 0 as an example, when the value of the feedback bit is 1, the feedback bit is the acknowledgement information, representing that the network device correctly received data on the corresponding resource unit. When the value of the feedback bit is 0, the feedback bit is the negative acknowledgement information, representing that the network device did not correctly receive data on the corresponding resource unit.

Exemplarily, when the feedback information is a single bit, the first signaling may include a bit stream. For example, in a data scheduling process, a resource set as illustrated in FIG. 8 is scheduled in the resource configuration information sent by the network device to the terminal and is recorded as the first resource set. The first resource set includes 24 resource units. Without considering code division multiplexing, each resource unit may correspond to one feedback bit, and thus 24 feedback bits are required for 24 resource units. The first signaling includes a 24-bit bit stream, and bits in the bit stream are in one-to-one correspondences with the resource units in FIG. 8. Herein, when the network device correctly received the data from the terminal on one of the 24 resource units, the feedback bit corresponding to the one resource unit may be set as ACK (the value “1” of the feedback bit may be used to represent ACK and the value “0” of the feedback bit may be used to represent NACK).

It can be seen that with the solution of embodiments of the present disclosure, for each terminal, only one piece of feedback information (such as one bit) in the first signaling is required to perform reception feedback on the data transmitted by the terminal. Thus even if a large number of resources such as 1000 resource units are configured in the resource configuration, the total bit overhead required is only 1000 bits. Therefore, embodiments of the present disclosure may effectively control the feedback overhead, thereby enabling effective communication in the zero-power scenarios with a large number of terminals.

In an example, as described above, each resource unit may correspond to multiple pieces of feedback information. Exemplarily, the respective feedback information corresponding to each resource unit includes multiple pieces of feedback information which are in one-to-one correspondences with multiple codewords supported by the each resource unit.

For example, if each resource unit may support multiple orthogonal or non-orthogonal codewords, then multiple codewords on a same resource unit may support data transmission of multiple terminals. Therefore, respective feedback information in the first signaling is also required for each codeword. For example, assuming that the transmission of up to 4 codewords (the corresponding codeword indexes are 0, 1, 2, 3, respectively) may be supported on each resource unit, then each resource unit corresponds to 4 pieces of feedback information.

Herein, each of the multiple pieces of feedback information indicates whether the network device correctly received data using a codeword corresponding to the feedback information from the terminal based on the resource unit corresponding to the feedback information.

For example, if 2 codewords are supported for data transmission on each resource unit, where the codeword indexes are 0 and 1 respectively, then there are 2 pieces of feedback information corresponding to each resource unit, and the 2 pieces of feedback information correspond to the 2 codewords respectively. For example, in FIG. 8, the resource unit 1 corresponds to 2 pieces of feedback information, herein, one piece of feedback information indicates whether the network device correctly received the data that uses the codeword 0 from the terminal based on the resource unit 1, and the other piece of feedback information indicates whether the network device correctly received the data that uses the codeword 1 from the terminal based on the resource unit 1.

When each resource unit supports multiple codewords, after transmitting the data, the terminal determines whether the network device correctly received the data based on the resource unit used for transmitting the data, the codeword used for transmitting the data and the first signaling. Specifically, when the terminal transmits the data based on the first resource unit in the first resource set, the terminal determines whether the network device correctly received the data based on the feedback information, corresponding to the first resource unit, in the first signaling, which specifically includes the following operation.

When the terminal transmits the data using a first codeword based on the first resource unit in the first resource set, the terminal determines whether the network device correctly received the data based on feedback information, corresponding to the first resource unit and the first codeword, in the first signaling.

In an example, the terminal may determine the feedback information, corresponding to the first resource unit and the first codeword, in the first signaling based on correspondences between resource units in the first resource set and feedback information in the first signaling. Herein, the correspondences may be configured by the network device, or pre-configured, or determined by the terminal device based on a predefined rule or mapping order.

Exemplarily, the first resource set may be one of multiple resource sets configured by the network device or pre-configured for the terminal to transmit data. For example, in order to match the channel conditions of different terminals, different terminal classes, and the like, the network device may send multiple resource configurations, each of which corresponds to a resource set. Multiple resource sets corresponding to the multiple resource configurations include a first resource set, a second resource set, and the like. The first signaling includes respective feedback information corresponding to each resource unit in the first resource set.

In an example, in case that the network device sends, to the terminal, multiple resource configurations indicating multiple resource sets, one processing method is to use different signalings corresponding to the multiple resource sets respectively. For example, the network device sends multiple signalings, where the multiple signalings are in one-to-one correspondences with the multiple resource sets. Herein, the first signaling is a signaling, corresponding to the first resource set, in the multiple signalings sent by the network device.

It can be understood that in case that the terminal selects the resource unit in the first resource set to transmit data, the first signaling corresponding to the first resource set is required to be determined from multiple signalings. Therefore, there is a need to consider how to configure correspondences between multiple signalings and multiple resource sets.

Exemplarily, based on a sending time order of the signalings and an order of set indexes of the resource sets, correspondences between each signaling and each resource set may be determined. For example, based on an order of signalings from early to late and an order of set indexes from small to large, the correspondences between each signaling and each set are established in turn.

That is to say, the sending time order of the multiple signalings is related to a numbering order of the multiple resource sets. Correspondingly, the above method further includes: the terminal determines the first signaling corresponding to the first resource set in the multiple signalings based on the sending time order of the multiple signalings and the numbering order of the multiple resource sets.

Exemplarily, correspondences between scrambling codes or radio network temporary identities (RNTIs) for the signalings and resource configurations may be established, i.e., scrambling codes for the multiple signalings are in one-to-one correspondences with the multiple resource sets, or RNTIs for the multiple signalings are in one-to-one correspondences with the multiple resource sets. Correspondingly, the above method further includes: the terminal determines the first signaling corresponding to the first resource set in the multiple signalings based on a scrambling code or RNTI corresponding to the first resource set.

Exemplarily, each signaling may indicate an index or serial number of a resource set corresponding to feedback information while carrying the feedback information.

In an example, in case that the network device sends, to the terminal, multiple resource configurations indicating multiple resource sets, another processing method is that the first signaling carries feedback information corresponding to the multiple resource sets at the same time. That is, the first signaling may include respective feedback information corresponding to each resource unit in each of the multiple resource sets.

With the above exemplary implementations, it can be seen that in case that the terminal transmits data, the terminal needs to determine the location of the feedback information corresponding to the terminal in the first signaling based on the information of one or more dimensions. In case that the network device correctly received the data, the network device also needs to determine the location of the feedback information corresponding to the data in the first signaling based on the information of one or more dimensions.

For example, without considering code division multiplexing and each resource unit corresponds to one piece of feedback information, if the terminal transmits data, then the terminal needs to determine the location of the corresponding feedback information in the first signaling based on the index of the resource unit used for transmitting the data.

For another example, in case that considering code division multiplexing and each resource unit supporting multiple codewords, if the terminal transmits data, then the terminal needs to determine the location of the corresponding feedback information in the first signaling based on the index of the resource unit used for transmitting the data and the index of the codeword used for transmitting the data.

For another example, in case that the first signaling carries feedback information corresponding to the multiple resource sets at the same time, if the terminal transmits data, the terminal needs to determine the location of the corresponding feedback information in the first signaling based on the index of the resource set selected when transmitting the data and the index of the used resource unit in the resource set.

Correspondingly, correspondences between each resource unit in the first resource set and each feedback information in the first signaling is also required to be determined based on the information of one or more dimensions.

Exemplarily, the above method may include that the network device determines correspondences between each resource unit in the first resource set and each feedback information in the first signaling based on a first mapping order; and/or, the terminal determines correspondences between each resource unit in the first resource set and each feedback information in the first signaling based on a first mapping order.

In practical applications, the first mapping order may include an order of information on multiple dimensions, for different situations.

In an example, the first mapping order includes a resource order, which includes an order of resource indexes of resource units in the first resource set.

For example, without considering code division multiplexing and the first signaling includes only feedback information corresponding to the first resource set but does not include feedback information corresponding to other resource sets, the first mapping order is the resource order.

Exemplarily, the resource order may include an order of the resource indexes of the resource units from small to large or from large to small.

In an example, each resource index includes a time domain index and/or a frequency domain index.

In an example, the resource order is determined based on an order of time domain indexes of the resource units and/or an order of frequency domain indexes of the resource units. Here, the order of the time domain indexes (which may be referred to as a time domain order for short) may be from small to large or from large to small. Similarly, the order of the frequency domain indexes (which may be referred to as a frequency domain order for short) may be from small to large or from large to small, which is not limited by the present disclosure. Exemplarily, the time domain index of the resource unit may be determined based on the time of the resource unit, and the order of the time domain indexes from small to large is namely an order of time from early to late (or the chronological order). The frequency domain index of the resource unit may be determined based on the frequency of the resource unit, and the order of the frequency domain indexes from small to large is namely an order of frequencies from low to high.

Figure 15:
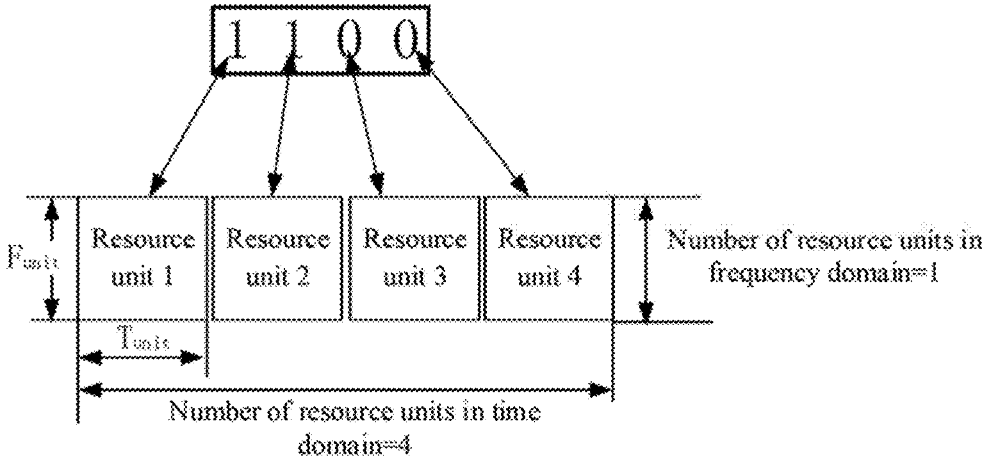
FIG. 15 is a first diagram of a first mapping order in an embodiment of the present disclosure.

For example, as illustrated in FIG. 15, for the first resource set, the number of resource units in frequency domain is 1, and the number of resource units in time domain is 4. Therefore, the resource index may include the time domain index, and the resource order is the order of time domain indexes. Based on the order of the time domain indexes of the resource units from small to large, by mapping the resource units with the feedback bits in the first signaling one by one, the one-to-one correspondences between the resource units 1-4 and four feedback bits in the first signaling (the values of the feedback bits in FIG. 15 are only examples) may be obtained.

Figure 16:
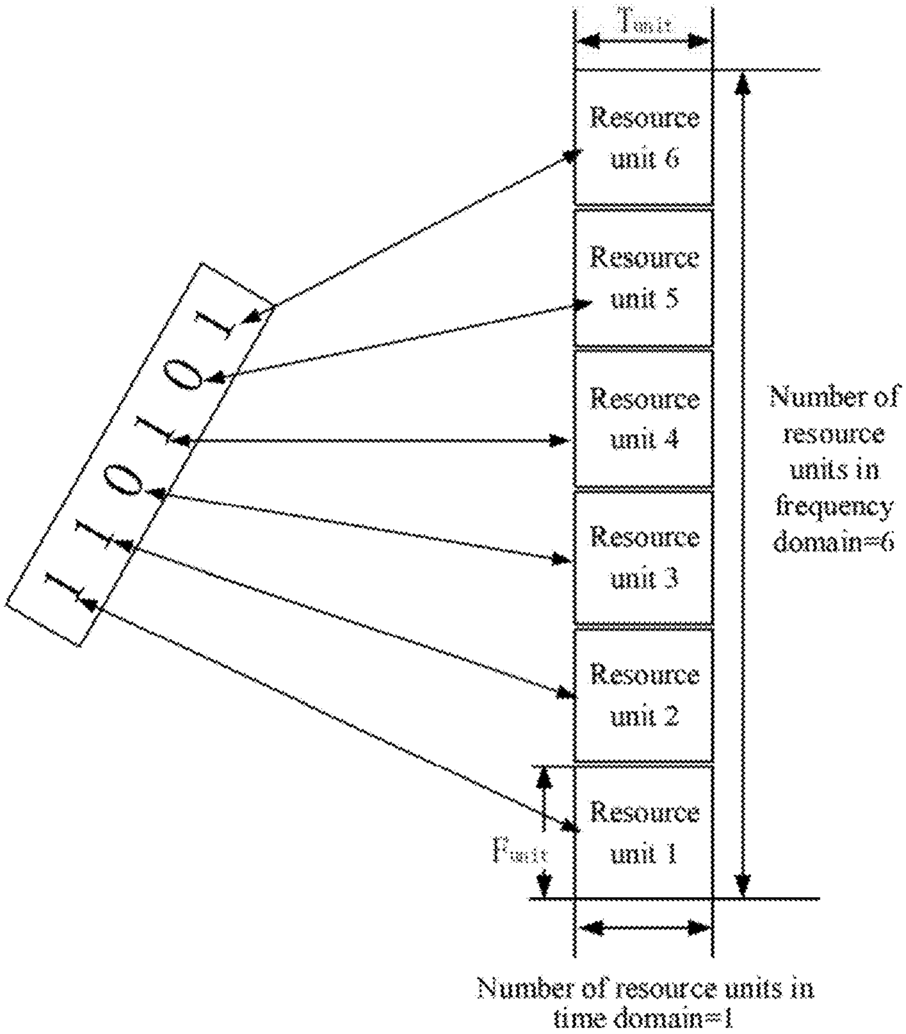
FIG. 16 is a second diagram of a first mapping order in an embodiment of the present disclosure.

For another example, as illustrated in FIG. 16, for the first resource set, the number of resource units in frequency domain is 6, and the number of resource units in time domain is 1. Therefore, the resource index may include the frequency domain index, and the resource order is the order of frequency domain indexes. Based on the order of the frequency domain indexes of the resource units from small to large, by mapping the resource units with the feedback bits in the first signaling one by one, the one-to-one correspondences between the resource units 1-6 and six feedback bits in the first signaling (the values of the feedback bits in FIG. 16 are only examples) may be obtained.

In an example, the resource order is also determined based on a sequential order between the order of the time domain indexes of the resource units and the order of the frequency domain indexes of the resource units. That is, the resource order may be the order of first time domain indexes and then frequency domain indexes, or the order of first frequency domain indexes and then time domain indexes. For example, the resource order is: first the time domain indexes from small to large and then the frequency domain indexes from small to large. Or, the resource order is: first the frequency domain indexes from large to small and then the time domain indexes from large to small.

Figure 17:
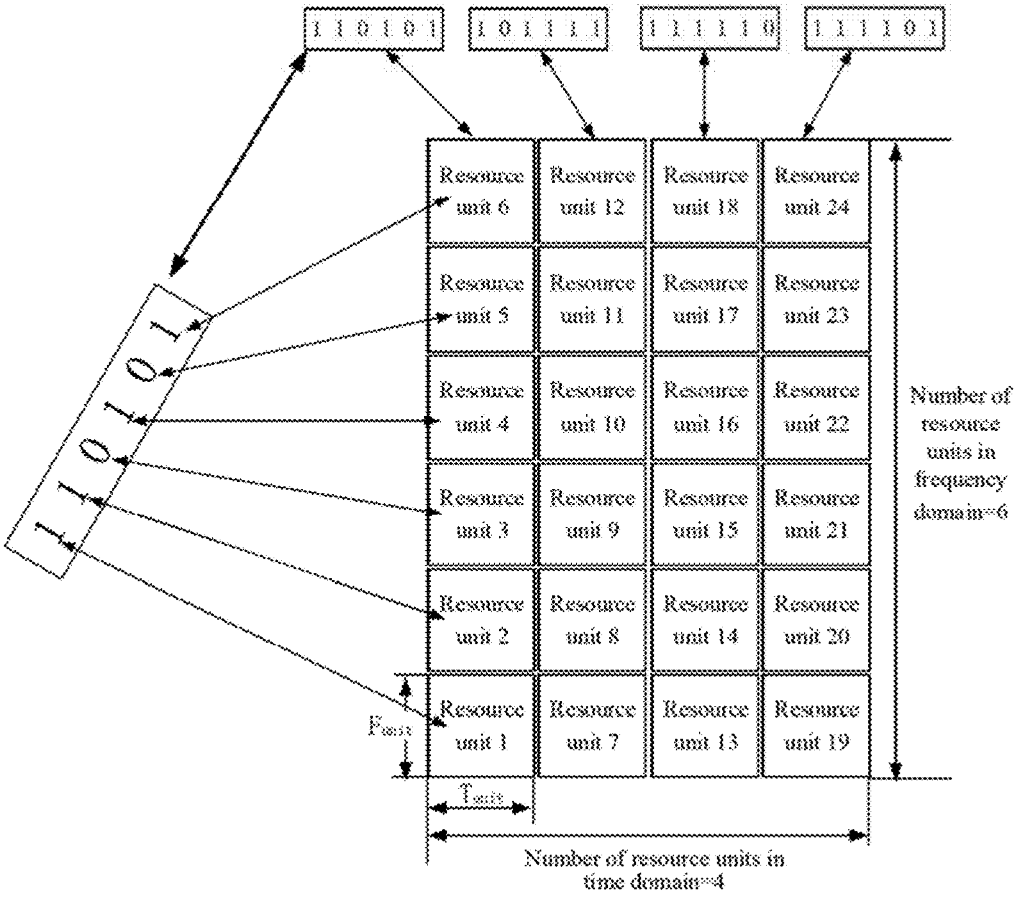
FIG. 17 is a third diagram of a first mapping order in an embodiment of the present disclosure.

For example, as illustrated in FIG. 17, for the first resource set, the number of resource units in frequency domain is 6, and the number of resource units in time domain is 4. Thus, the resource order may be determined based on the frequency domain order, the time domain order, and the sequential order between the time domain order and the frequency domain order.

Exemplarily, the resource order may be: first the frequency domain indexes from small to large (i.e., frequencies from low to high) and then time domain indexes from small to large (i.e., time from early to late). When determining the above correspondences, each resource unit in the first resource set corresponds one-to-one with each feedback bit in the first signaling according to the order of first the frequencies from low to high and then the time from early to late.

As illustrated in FIG. 17, the first signaling includes 24 feedback bits (the values of the feedback bits in FIG. 17 are only examples). Starting from the resource unit 1 earliest in time domain and lowest in frequency domain, firstly, the first 6 bits correspond one-to-one with the 6 resource units at the first time unit position according to the frequency domain order from low to high, herein, the 6 bits from first to last correspond to the resource units 1, 2, 3, . . . , 6 arranged from low to high in frequency domain, respectively. Then, the second 6 bits correspond to the 6 resource units at the second time unit position according to the time domain order from early to late, herein, the 6 bits are mapped one-to-one with the 6 resource units at the second time unit position in the same way. And so on until the correspondences between 24 bits and 24 resource units are determined.

Exemplarily, the resource order may also be: first the time domain indexes from small to large (i.e., from early to late in time domain) and then the frequency domain indexes from small to large (i.e., from low to high in frequency domain). When determining the above correspondences, each resource unit in the first resource set corresponds one-to-one with each feedback bit in the first signaling according to the order of first time from early to late and then frequencies from low to high.

Figure 18:
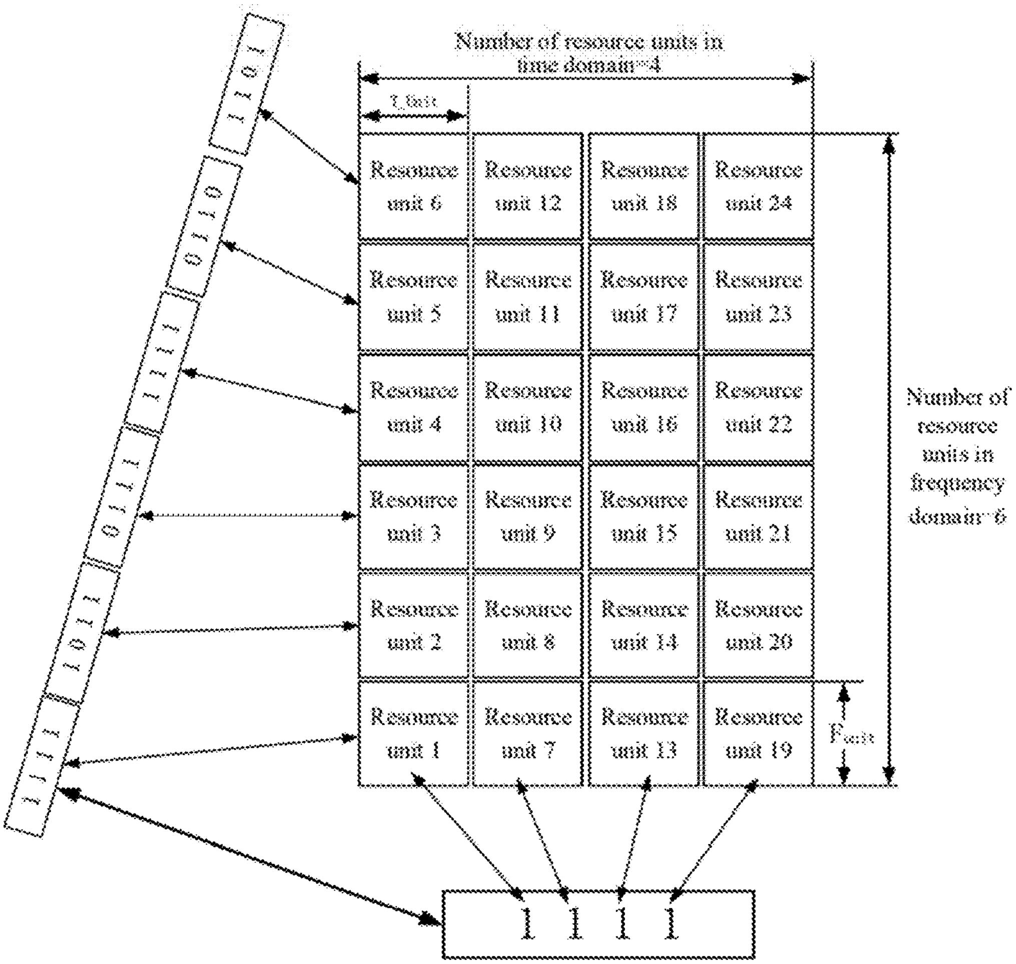
FIG. 18 is a fourth diagram of a first mapping order in an embodiment of the present disclosure.

As illustrated in FIG. 18, the first signaling includes 24 feedback bits (the values of the feedback bits in FIG. 18 are only examples). Starting from the resource unit 1 earliest in time domain and lowest in frequency domain, firstly, the first 4 bits correspond one-to-one with the 4 resource units with the lowest frequency according to the time domain order from early to late, herein, the 4 bits from first to last correspond to the resource units 1, 2, 3, 4 arranged from early to late in time domain, respectively. Then, the second 4 bits correspond to the 4 resource units at the second lowest frequency domain position according to the frequency domain order from low to high, herein, the 4 bits are mapped one-to-one with the 4 resource units at the second lowest frequency domain position in the same way. And so on until the correspondences between 24 bits and 24 resource units are determined.

Exemplarily, the resource order may also be any one of: an order of first the frequency domain indexes from large to small and then the time domain indexes from small to large; an order of first the frequency domain indexes from small to large and then the time domain indexes from large to small; an order of first the frequency domain indexes from large to small and then the time domain indexes from large to small; an order of first the time domain indexes from large to small and then the frequency domain indexes from small to large; an order of first the time domain indexes from small to large and then the frequency domain indexes from large to small; or an order of first the time domain indexes from large to small and then the frequency domain indexes from large to small.

Specific details of determining the correspondences between the resource units and the feedback information based on the above resource order may be realized by referring to the example implementations of FIGS. 17 and 18, and will not be repeated here.

In an example, the first mapping order may further include: a codeword order, which includes an order of codeword indexes of multiple codewords supported by each resource unit; and/or, a set order, which includes an order of set indexes of multiple resource sets.

In an example, the first mapping order further includes a sequence of the resource order, and/or the codeword order and/or the set order.

Several specific examples are provided below.

The First Example

In case that code division multiplexing is used, determination of correspondences between each resource unit in the first resource set and each feedback information in the first signaling needs to take into account the codeword order. The implementations of the first mapping order are different according to the different situations of the resource units in the first resource set.

The first situation: for the first resource set, the number of resource units in frequency domain is 1, and the number of resource units in time domain is multiple, such as the situation illustrated in FIG. 15.

In this situation, the first mapping order includes the time domain order of the resource units and the above codeword order, and further includes the sequential order between the time domain order and the codeword order. Exemplarily, the first mapping order may be first the codeword order and then the time domain order, or first the time domain order and then the codeword order. Herein, both the codeword order and the time domain order may be from large to small or from small to large. Specifically, the first mapping order may be any one of: an order of first the codeword indexes from small to large and then the time domain indexes from small to large; an order of first the codeword indexes from large to small and then the time domain indexes from small to large; an order of first the codeword indexes from small to large and then the time domain indexes from large to small; an order of first the codeword indexes from large to small and then the time domain indexes from large to small; an order of first the time domain indexes from small to large and then the codeword indexes from small to large; an order of first the time domain indexes from large to small and then the codeword indexes from small to large; an order of first the time domain indexes from small to large and then the codeword indexes from large to small; or an order of first the time domain indexes from large to small and then the codeword indexes from large to small.

Figure 19:
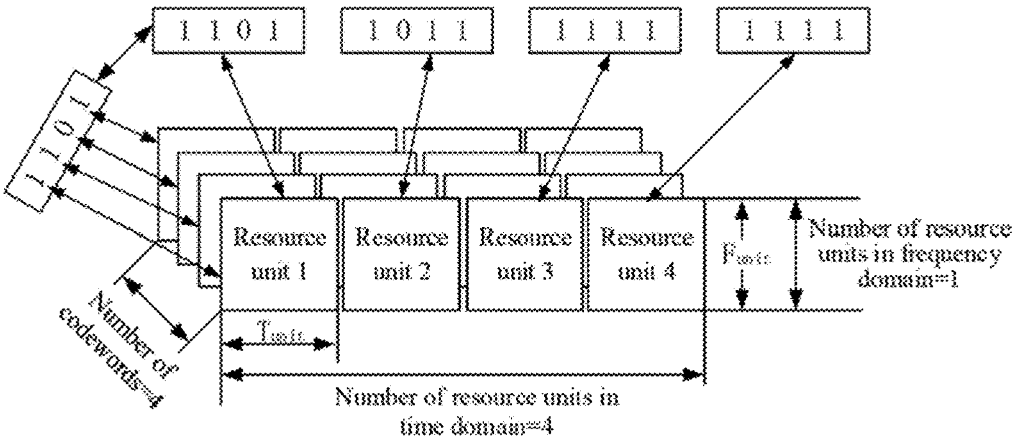
FIG. 19 is a fifth diagram of a first mapping order in an embodiment of the present disclosure.

Referring to FIG. 19 below, it is explained how to determine correspondences between each resource unit in the first resource set and each feedback information in the first signaling based on the first mapping order (i.e., the order of first the codeword indexes from small to large and then the time domain indexes from small to large). As illustrated in FIG. 19, the first signaling includes 16 feedback bits (the values of the feedback bits in FIG. 19 are only examples). Starting from the first codeword on the resource unit 1 earliest in time domain, firstly, the first 4 bits correspond one-to-one with the 4 codewords of the resource unit 1 according to the codeword indexes from small to large. Then, the second 4 bits correspond to the 4 codewords of the resource unit 2 according to the time domain indexes from small to large, herein, the 4 bits are mapped one-to-one with the 4 codewords of the resource unit 2 in the same way (codeword indexes from small to large). And so on until the correspondences between 16 bits and 4 resource units are determined. Situations that the first mapping order is other orders may be implemented similarly and the specific details will not be repeated.

The second situation: for the first resource set, the number of resource units in time domain is 1, and the number of resource units in frequency domain is multiple, such as the situation illustrated in FIG. 16.

In this situation, the first mapping order includes the frequency domain order of the resource units and the above codeword order, and further includes the sequential order between the frequency domain order and the codeword order. Exemplarily, the first mapping order may be first the codeword order and then the frequency domain order, or first the frequency domain order and then the codeword order. Herein, both the codeword order and the frequency domain order may be from large to small or from small to large. Specifically, the first mapping order may be any one of: an order of first the codeword indexes from small to large and then the frequency domain indexes from small to large; an order of first the codeword indexes from large to small and then the frequency domain indexes from small to large; an order of first the codeword indexes from small to large and then the frequency domain indexes from large to small; an order of first the codeword indexes from large to small and then the frequency domain indexes from large to small; an order of first the frequency domain indexes from small to large and then the codeword indexes from small to large; an order of first the frequency domain indexes from large to small and then the codeword indexes from small to large; an order of first the frequency domain indexes from small to large and then the codeword indexes from large to small; or an order of first the frequency domain indexes from large to small and then the codeword indexes from large to small.

The process of determining the correspondences between the resource units and the feedback information based on any of the above order may be similarly realized by referring to the processing of FIG. 19 and the specific details will not be repeated in detail.

The third situation: for the first resource set, the number of resource units in time domain is multiple, and the number of resource units in frequency domain is multiple, such as the situation illustrated in FIGS. 17 and 18.

In this situation, the first mapping order includes the time domain order, the frequency domain order, and the codeword order, and further includes the sequential order of the time domain order, the frequency domain order, and the codeword order. Herein, the sequential order may be any one of: an order of first the codeword order, then the frequency domain order, and finally the time domain order; an order of first the codeword order, then the time domain order, and finally the frequency domain order; an order of first the frequency domain order, then the codeword order, and finally the time domain order; an order of first the frequency domain order, then the time domain order, and finally the codeword order; an order of first the time domain order, then the codeword order, and finally the frequency domain order; or an order of first the time domain order, then the frequency domain order, and finally the codeword order.

Herein, the codeword order, the frequency domain order, and the time domain order may all be from small to large or from large to small; or, one or more of the codeword order, the frequency domain order, and the time domain order may be from small to large, and other orders may be from large to small.

Taking first the codeword order, then the frequency domain order, and finally the time domain order as an example, it is assumed that the first resource set includes 24 resource units (4 resource units in time domain multiplied by 6 resource units in frequency domain), and each resource unit supports 4 codewords. According to the foregoing description, it can be seen that 96 feedback bits are required in the first signaling. Referring to the resource set illustrated in FIG. 8, starting from the first codeword on the resource unit 1 with the smallest time domain index and the smallest frequency domain index, firstly, the first 4 bits correspond one-to-one with the 4 codewords on the resource unit 1 according to the codeword indexes from small to large. Then, the second 4 bits correspond to the 4 codewords of the resource unit 2 according to the frequency domain indexes from small to large, herein, the 4 bits are mapped one-to-one with the 4 codewords of the resource unit 2 in the same way (codeword indexes from small to large). And so on, the correspondences between the first 24 bits and the resource units 1-6 are determined. Then, the correspondences between the second 24 bits and the resource units 7-12 are determined according to the time domain indexes from small to large. And so on until the correspondences between the 96 bits and the 24 resource units are determined. Herein, 24 bits are required at each time domain unit position, corresponding to 6 resource units with frequency domain indexes from small to large. Herein, every 4 bits correspond to 4 codewords on one resource unit, and 4 bits correspond one-to-one with 4 codewords with codeword indexes from small to large. Situations that the first mapping order is other orders may be implemented similarly and the specific details will not be repeated.

The Second Example

In case that the first signaling includes respective feedback information corresponding to each resource unit in each of multiple resource sets, determination of correspondences between each resource unit in the first resource set and each feedback information in the first signaling needs to take into account the set order.

Without considering code division multiplexing, the first mapping order includes the set order, and further includes the time domain order and/or the frequency domain order. Specifically, for the processing of the first to third situations of the resource units in the resource set, reference may be made to the following contents.

The first situation: for each of the multiple resource sets, the number of resource units in frequency domain is 1, and the number of resource units in time domain is multiple.

In this situation, the first mapping order includes the time domain order of the resource units and the above set order, and further includes the sequential order between the time domain order and the set order. Exemplarily, the first mapping order may be first the set order and then the time domain order, or first the time domain order and then the set order. Herein, both the set order and the time domain order may be from large to small or from small to large. Specifically, the first mapping order may be any one of: an order of first the set indexes from small to large and then the time domain indexes from small to large; an order of first the set indexes from large to small and then the time domain indexes from small to large; an order of first the set indexes from small to large and then the time domain indexes from large to small; an order of first the set indexes from large to small and then the time domain indexes from large to small; an order of first the time domain indexes from small to large and then the set indexes from small to large; an order of first the time domain indexes from large to small and then the set indexes from small to large; an order of first the time domain indexes from small to large and then the set indexes from large to small; or an order of first the time domain indexes from large to small and then the set indexes from large to small.

Taking first the set indexes from small to large and then the time domain indexes from small to large as an example, it is assumed that there are 4 resource sets, each of which includes 4 resource units in time domain. Starting from the first resource unit in the set 1, firstly, the first 4 bits correspond one-to-one with the first resource units in the 4 resource sets according to the set indexes from small to large. Then, the second 4 bits correspond to the second resource units of the 4 resource sets according to the time domain indexes from small to large, herein, the 4 bits are mapped one-to-one with the second resource units of the 4 resource sets in the same way (set indexes from small to large). And so on until the correspondences between 16 bits and a total of 16 resource units in the 4 resource sets are determined. Situations that the first mapping order is other orders may be implemented similarly and the specific details will not be repeated.

The second situation: for each of the multiple resource sets, the number of resource units in time domain is 1, and the number of resource units in frequency domain is multiple.

In this situation, the first mapping order includes the frequency domain order of the resource units and the above set order, and further includes the sequential order between the frequency domain order and the set order. Exemplarily, the first mapping order may be first the set order and then the frequency domain order, or first the frequency domain order and then the set order. Herein, both the set order and the frequency domain order may be from large to small or from small to large. Specifically, the first mapping order may be any one of: an order of first the set indexes from small to large and then the frequency domain indexes from small to large; an order of first the set indexes from large to small and then the frequency domain indexes from small to large; an order of first the set indexes from small to large and then the frequency domain indexes from large to small; an order of first the set indexes from large to small and then the frequency domain indexes from large to small; an order of first the frequency domain indexes from small to large and then the set indexes from small to large; an order of first the frequency domain indexes from large to small and then the set indexes from small to large; an order of first the frequency domain indexes from small to large and then the set indexes from large to small; or an order of first the frequency domain indexes from large to small and then the set indexes from large to small.

The process of determining the correspondences between the resource units and the feedback information based on any one of the above orders may be similarly realized by referring to the aforementioned first condition in the present example and the specific details will not be repeated in detail.

The third situation: for each of the multiple resource sets, the number of resource units in time domain is multiple, and the number of resource units in frequency domain is multiple.

In this situation, the first mapping order includes the time domain order, the frequency domain order, and the set order, and further includes the sequential order of the time domain order, the frequency domain order, and the set order. Herein, the sequence may be any one of: an order of first the set order, then the frequency domain order, and finally the time domain order; an order of first the set order, then the time domain order, and finally the frequency domain order; an order of first the frequency domain order, then the set order, and finally the time domain order; an order of first the frequency domain order, then the time domain order, and finally the set order; an order of first the time domain order, then the set order, and finally the frequency domain order; or an order of first the time domain order, then the frequency domain order, and finally the set order.

Herein, the set order, the frequency domain order, and the time domain order may all be from small to large or from large to small; or, one or more of the set order, the frequency domain order, and the time domain order may be from small to large, and other orders may be from large to small.

Figure 20:
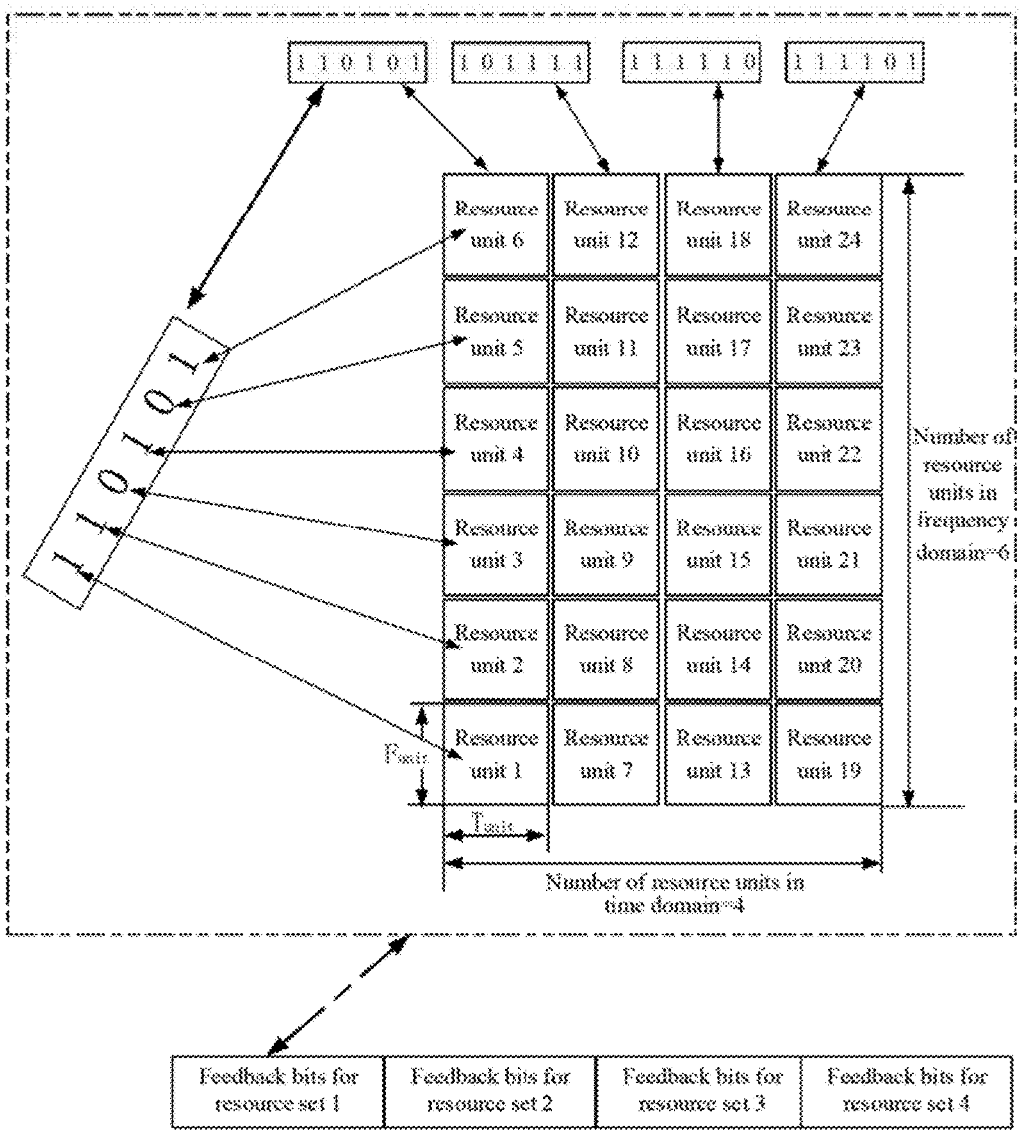
FIG. 20 is a sixth diagram of a first mapping order in an embodiment of the present disclosure.

Take first the frequency domain order from low to high, then the time domain order from early to late, and finally the set indexes from small to large as an example. As illustrated in FIG. 20, each resource set includes 24 resource units (4 resource units in time domain multiplied by 6 resource units in frequency domain). 96 feedback bits corresponding to a total of 96 resource units in the 4 resource sets are required in the first signaling. Referring to FIG. 20, starting from the resource unit 1 in the resource set 1, firstly, the first 6 bits correspond one-to-one with the 6 resource units at the first time unit position (resource units 1-6) according to the frequency domain order from low to high. Then, the second 6 bits correspond to the 6 resource units at the second time unit position (resource units 7-12) according to the time domain order from early to late, herein, the 6 bits are mapped one-to-one with the 6 resource units in the same way (frequency domain order from low to high). And so on, the correspondences between the first 24 bits and the 24 resource units in the resource set 1 are determined. Then, the correspondences between the second 24 bits and the 24 resource units in the resource set 2 are determined according to the set indexes from small to large. And so on until the correspondences between the 96 bits and the total of 96 resource units in the 4 resource sets are determined. Situations that the first mapping order is other orders may be implemented similarly and the specific details will not be repeated.

In case of considering code division multiplexing, the first mapping order includes the set order and the codeword order, and further includes the time domain order and/or the frequency domain order. Further, the first mapping order also includes the sequential order of the set order, the codeword order, the time domain order, and the frequency domain order. Moreover, the set order, the codeword order, the time domain order, and the frequency domain order may all be from small to large or from large to small; or, one or more of the set order, the codeword order, the time domain order, and the frequency domain order may be from small to large, and other orders may be from large to small. It is not listed here.

Taking first codeword indexes from small to large, then the frequency domain order from low to high, then the time domain order from early to late, and finally set indexes from small to large as an example, it is assumed that each resource set is the resource set as illustrated in FIG. 20, including 24 resource units (4 resource units in time domain multiplied by 6 resource units in frequency domain), where each resource unit supports 4 codewords. 384 feedback bits corresponding to a total of 96 resource units in the 4 resource sets are required in the first signaling. Starting from the resource unit 1 in the resource set 1, firstly, the first 4 bits correspond one-to-one with the 4 codewords on the resource unit 1 according to the codeword indexes from small to large.

Then, the second 4 bits correspond one-to-one with the 4 codewords on the resource unit 2 according to the frequency domain order from low to high. And so on, the correspondences between the first 24 bits and the 6 resource units at the first time unit position (resource units 1-6) are determined. Then, the second 24 bits correspond to the 6 resource units at the second time unit position (resource units 7-12) according to the time domain order from early to late. And so on, the correspondences between the first 96 bits and the 24 resource units in the resource set 1 are determined. Then, the correspondences between the second 96 bits and the 24 resource units in the resource set 2 are determined according to the set indexes from small to large. And so on until the correspondences between the 384 bits and the total of 96 resource units in the 4 resource sets are determined. Situations that the first mapping order is other orders may be implemented similarly and the specific details will not be repeated.

In an example, the aforementioned first mapping order for determining the correspondences between the each resource unit in the first resource set and each feedback information in the first signaling is preset.

In an example, the first mapping order is determined by the network device, i.e., the above method further includes: the network device sends a second signaling indicating the first mapping order. Correspondingly, the terminal receives the second signaling.

The specific arrangement and implementation of embodiments of the present disclosure have been described above from different angles through multiple embodiments. With at least one embodiment, the network device feeds back to the terminal whether the data transmitted on a resource unit is correctly received by carrying feedback information corresponding to the resource unit in the first signaling, so that the terminal can determine whether the data transmission is completed based on the feedback information, thereby accurately completing the communication. Moreover, the feedback overhead is effectively controlled, so that effective communication can be achieved in the zero-power communication scenario with more terminals.

Figure 21:
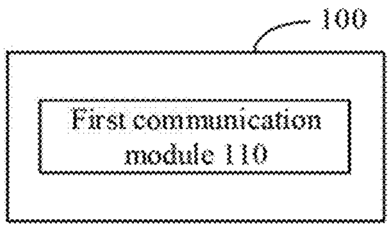
FIG. 21 is a structural block diagram of a network device according to an embodiment of the present disclosure.

FIG. 21 is a schematic block diagram of a network device 100 according to an embodiment of the present disclosure. The network device 100 may include a first communication module 110.

The first communication module 110 is configured to send a first signaling including respective feedback information corresponding to each resource unit in a first resource set.

Herein, the feedback information indicates whether the network device 100 correctly received, based on the resource unit corresponding to the feedback information, data transmitted by the terminal.

In an embodiment of the present disclosure, the first resource set is a resource set configured by the network device 100 or pre-configured for the terminal to transmit data.

In an embodiment of the present disclosure, the feedback information is acknowledgment information or negative acknowledgement information.

In an embodiment of the present disclosure, the feedback information is the acknowledgement information when the feedback information includes a first bit value.

In an embodiment of the present disclosure, the feedback information is the negative acknowledgement information when the feedback information includes a second bit value.

In an embodiment of the present disclosure, the feedback information is a single bit.

In an embodiment of the present disclosure, the respective feedback information corresponding to each resource unit includes multiple pieces of feedback information that are in one-to-one correspondences with multiple codewords supported by each resource unit.

Each of the multiple pieces of feedback information indicates whether the network device 100 correctly received, based on the resource unit corresponding to the feedback information, data using a codeword corresponding to the feedback information from the terminal.

In an embodiment of the present disclosure, the first resource set is one of multiple resource sets configured by the network device 100 or pre-configured for the terminal to transmit data.

In an embodiment of the present disclosure, the first signaling includes respective feedback information corresponding to each resource unit in each of the multiple resource sets.

Figure 22:
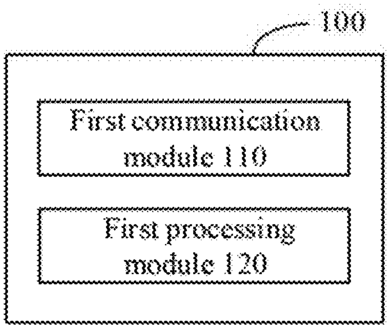
FIG. 22 is a structural block diagram of a network device according to another embodiment of the present disclosure.

As illustrated in FIG. 22, in an embodiment of the present disclosure, the network device 100 further includes a first processing module.

The first processing module 120 is configured to determine correspondences between each resource unit in the first resource set and each feedback information in the first signaling based on a first mapping order.

In an embodiment of the present disclosure, the first mapping order includes a resource order, which includes an order of resource indexes of resource units in the first resource set.

In an embodiment of the present disclosure, each resource index includes a time domain index and/or a frequency domain index.

In an embodiment of the present disclosure, the resource order is determined based on an order of time domain indexes of the resource units and/or an order of frequency domain indexes of the resource units.

In an embodiment of the present disclosure, the resource order is further determined based on a sequential order between the order of the time domain indexes of the resource units and the order of the frequency domain indexes of the resource units.

In an embodiment of the present disclosure, the first mapping order further includes: a codeword order, which includes an order of codeword indexes of multiple codewords supported by each resource unit; and/or, a set order, which includes an order of set indexes of multiple resource sets.

In an embodiment of the present disclosure, the first mapping order further includes a sequential order of the resource order and/or the codeword order and/or the set order.

In an embodiment of the present disclosure, the first mapping order is preset.

In an embodiment of the present disclosure, the first mapping order is determined by the network device 100, and the first communication module 110 is further configured to send a second signaling indicating the first mapping order.

In an embodiment of the present disclosure, the first signaling is a signaling corresponding to the first resource set in multiple signalings sent by the network device 100, and the multiple signalings are in one-to-one correspondences with the multiple resource sets.

In an embodiment of the present disclosure, a sending time order of the multiple signalings is related to a numbering order of the multiple resource sets.

In an embodiment of the present disclosure, scrambling codes or radio network temporary identities RNTIs for the multiple signalings are in one-to-one correspondences with the multiple resource sets.

In an embodiment of the present disclosure, the terminal is a zero-power terminal.

The network device 100 of embodiments of the present disclosure can realize the corresponding functions of the network device in the aforementioned method embodiments. For the flows, functions, implementations and beneficial effects corresponding to each module (sub-module, unit or component, or the like) in the network device 100, the reference may be made to the corresponding description in the above method embodiments, and will not be repeated here. It should be noted that the functions described with respect to each module (sub-module, unit or component, or the like) in the network device 100 of embodiments of the present disclosure may be realized by different modules (sub-modules, units or components, or the like) or by the same module (sub-module, unit or component, or the like). For example, a first sending module and a second sending module may be different modules or the same module, and can realize corresponding functions in embodiments of the present disclosure. In addition, the communication module in embodiments of the present disclosure may be realized by the transceiver of the device, and some or all of the remaining modules may be realized by the processor of the device.

Figure 23:
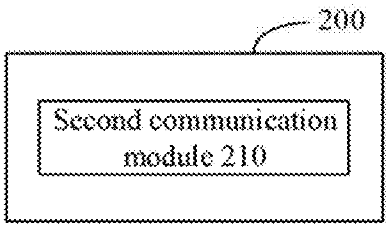
FIG. 23 is a structural block diagram of a terminal according to an embodiment of the present disclosure.

Corresponding to the processing method of at least one embodiment described above, embodiments of the present disclosure also provides a terminal 200, referring to FIG. 23, including a second communication module 21.

The second communication module 210 is configured to receive a first signaling including respective feedback information corresponding to each resource unit in a first resource set.

Herein, the feedback information indicates whether a network device correctly received, based on the resource unit corresponding to the feedback information, data transmitted by the terminal 200.

Figure 24:
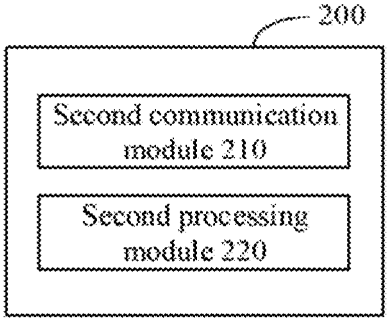
FIG. 24 is a structural block diagram of a terminal according to another embodiment of the present disclosure.

In an example, as illustrated in FIG. 24, the terminal 200 further includes a second processing module 220.

The second processing module 220 is configured to determine, when the terminal 200 transmits data based on a first resource unit in the first resource set, whether the network device correctly received the data based on feedback information corresponding to the first resource unit in the first signaling.

In an embodiment of the present disclosure, the second processing module 220 is further configured to: determine the feedback information corresponding to the first resource unit in the first signaling based on correspondences between each resource unit in the first resource set and each feedback information in the first signaling.

In an embodiment of the present disclosure, the respective feedback information corresponding to each resource unit includes multiple pieces of feedback information that are in one-to-one correspondences with multiple codewords supported by each resource unit.

Herein, each of the multiple pieces of feedback information indicates whether the network device correctly received, based on the resource unit corresponding to the feedback information, data using a codeword corresponding to the feedback information from the terminal 200.

In an embodiment of the present disclosure, the terminal 200 further includes a second processing module 220.

The second processing module 220 is configured to determine, when the terminal 200 transmits data using a first codeword based on a first resource unit in the first resource set, whether the network device correctly received the data based on feedback information corresponding to the first resource unit and the first codeword in the first signaling.

In an embodiment of the present disclosure, the second processing module 220 is further configured to: determine the feedback information corresponding to the first resource unit and the first codeword in the first signaling based on correspondences between each resource unit in the first resource set and each feedback information in the first signaling.

In an embodiment of the present disclosure, the first resource set is one of multiple resource sets configured by the network device or pre-configured for the terminal 200 to transmit data.

In an embodiment of the present disclosure, the first signaling includes respective feedback information corresponding to each resource unit in each of the multiple resource sets.

In an embodiment of the present disclosure, the second processing module 220 in the terminal 200 is configured to: determine correspondences between each resource unit in the first resource set and each feedback information in the first signaling based on a first mapping order.

In an embodiment of the present disclosure, the first mapping order includes a resource order, which includes an order of resource indexes of resource units in the first resource set.

In an embodiment of the present disclosure, each resource index includes a time domain index and/or a frequency domain index.

In an embodiment of the present disclosure, the resource order is determined based on an order of time domain indexes of the resource units and/or an order of frequency domain indexes of the resource units.

In an example, in an embodiment of the present disclosure, the resource order is further determined based on a sequential order between the order of the time domain indexes of the resource units and the order of the frequency domain indexes of the resource units.

In an embodiment of the present disclosure, the first mapping order further includes: a codeword order, which includes an order of codeword indexes of multiple codewords supported by each resource unit; and/or, a set order, which includes an order of set indexes of multiple resource sets.

In an embodiment of the present disclosure, the first mapping order further includes a sequential order of the resource order and/or the codeword order and/or the set order.

In an embodiment of the present disclosure, the first mapping order is preset.

In an embodiment of the present disclosure, the second communication module 210 is further configured to: receive a second signaling indicating the first mapping order.

In an embodiment of the present disclosure, the first signaling is a signaling corresponding to the first resource set in multiple signalings sent by the network device, and the multiple signalings are in one-to-one correspondences with the multiple resource sets.

In an embodiment of the present disclosure, a sending time order of the multiple signalings is related to a numbering order of the multiple resource sets.

The second processing module 220 in the terminal 200 is configured to: determine the first signaling corresponding to the first resource set in the multiple signaling based on the sending time order of the multiple signalings and the numbering order of the multiple resource sets.

In an embodiment of the present disclosure, scrambling codes or RNTIs for the multiple signalings are in one-to-one correspondences with the multiple resource sets.

The second processing module 220 in the terminal 200 is configured to: determine the first signaling corresponding to the first resource set in the multiple signalings based on a scrambling code or RNTI corresponding to the first resource set.

In an embodiment, the terminal 200 includes a zero-power terminal 200.

The terminal 200 of embodiments of the present disclosure can realize the corresponding functions of the terminal in the aforementioned method embodiments. For the flows, functions, implementations and beneficial effects corresponding to each module (sub-module, unit or component, or the like) in the terminal 200, the reference may be made to the corresponding description in the above method embodiments, and will not be repeated here. It should be noted that the functions described with respect to each module (sub-module, unit or component, or the like) in the terminal 200 of embodiments of the present disclosure may be realized by different modules (sub-modules, units or components, or the like) or by the same module (sub-module, unit or component, or the like). For example, a first sending module and a second sending module may be different modules or the same module, and can realize corresponding functions in embodiments of the present disclosure. In addition, the communication module in embodiments of the present disclosure may be realized by the transceiver of the device, and some or all of the remaining modules may be realized by the processor of the device.

Figure 25:
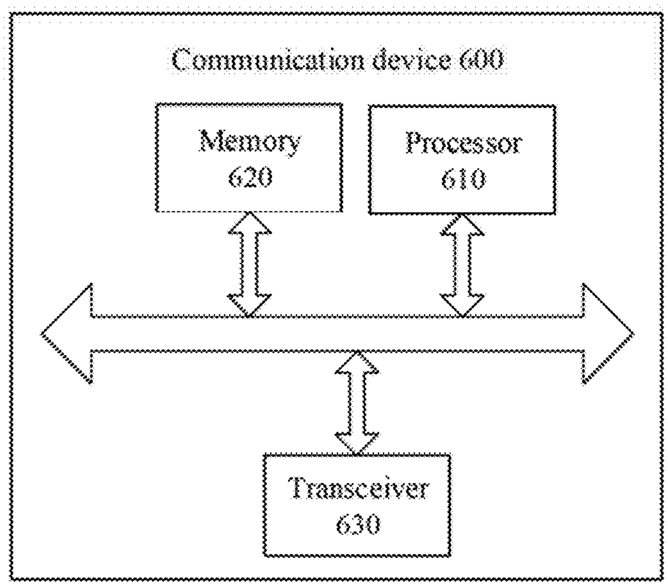
FIG. 25 is a block diagram of a communication device according to an embodiment of the present disclosure.

FIG. 25 is a schematic structural diagram of a communication device 600 according to an embodiment of the present disclosure. The communication device 600 includes a processor 610 configured to invoke and run a computer program from a memory to implement the methods in embodiments of the present disclosure.

In an example, the communication device 600 may further include a memory 620. Herein, the processor 610 may invoke and run a computer program from the memory 620 to implement the methods in embodiments of the present disclosure.

Herein, the memory 620 may be a separate device independent of the processor 610, or may be integrated into the processor 610.

In an example, the communication device 600 may further include a transceiver 630. The processor 610 may control the transceiver 630 to communicate with other devices, and in particular, may send information or data to other devices, or receive information or data sent from other devices.

Herein, the transceiver 630 may include a transmitter and a receiver. The transceiver 630 may further include antennas, the number of which may be one or more.

In an example, the communication device 600 may be the network device of embodiments of the present disclosure, and the communication device 600 may implement the corresponding flows implemented by the network device in various methods of embodiments of the present disclosure, and will not be repeated here for the sake of brevity.

In an example, the communication device 600 may be the terminal of embodiments of the present disclosure, and the communication device 600 may implement the corresponding flows implemented by the terminal in various methods of embodiments of the present disclosure, and will not be repeated here for the sake of brevity.

Figure 26:
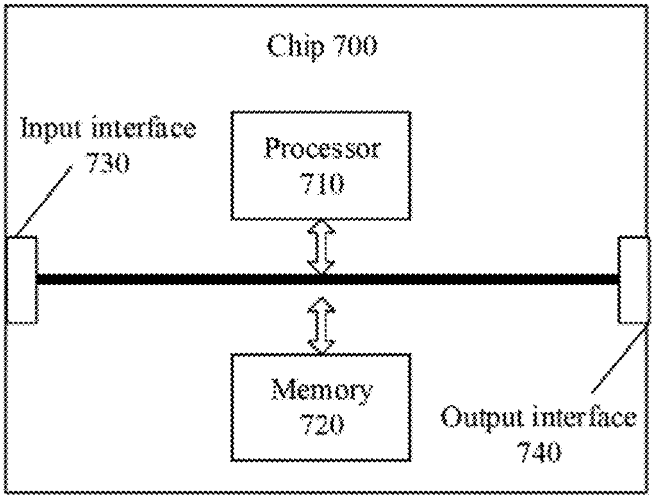
FIG. 26 is a block diagram of a chip of an embodiment according to the present disclosure.

FIG. 26 is a schematic structural diagram of a chip 700 according to an embodiment of the present disclosure. The chip 700 includes a processor 710 configured to invoke and run a computer program from a memory to implement the methods in embodiments of the present disclosure.

In an example, the chip 700 may further include a memory 720. Herein, the processor 710 may invoke and run a computer program from the memory 720 to implement the methods in embodiments of the present disclosure.

Herein, the memory 720 may be a separate device independent of the processor 710, or may be integrated into the processor 710.

In an example, the chip 700 may further include an input interface 730. Herein, the processor 710 may control the input interface 730 to communicate with other devices or chips, and in particular, may obtain information or data sent from other devices or chips.

In an example, the chip 700 may further include an output interface 740. Herein, the processor 710 may control the output interface 740 to communicate with other devices or chips, and in particular, may output information or data to other devices or chips.

In an example, the chip may be applied to the network device of embodiments of the present disclosure, and the chip may implement the corresponding flows implemented by the network device in various methods of embodiments of the present disclosure, and will not repeated herein for the sake of brevity.

In an example, the chip may be applied to the terminal of embodiments of the present disclosure, and the chip may implement the corresponding flows implemented by the terminal in various methods of embodiments of the present disclosure, and will not repeated herein for the sake of brevity.

It should be understood that the chip mentioned in embodiments of the present disclosure may also be referred to as a system level chip, a system chip, a chip system, or a system on chip, or the like.

The above-mentioned processor may be a general purpose processor, a digital signal processor (DSP), a field programmable gate array (FPGA), an application specific integrated circuit (ASIC) or other programmable logic devices, a transistor logic device, or a discrete hardware component, or the like. Herein, the above-mentioned general purpose processor may be a microprocessor, or may be any conventional processor or the like.

The above-mentioned memory may be volatile memory or non-volatile memory or may include both volatile and non-volatile memories. Herein, the non-volatile memory may be a read-only memory (ROM), a programmable ROM (PROM), an erasable PROM (EPROM), an electrically EPROM (EEPROM), or a flash memory. The volatile memory may be a random access memory (RAM).

It should be understood that the above-mentioned memory is exemplary, but not limiting. For example, the memory in embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM), and the like. That is to say, the memory in embodiments of the present disclosure is intended to include but not to limit these and any other suitable types of memories.

Figure 27:
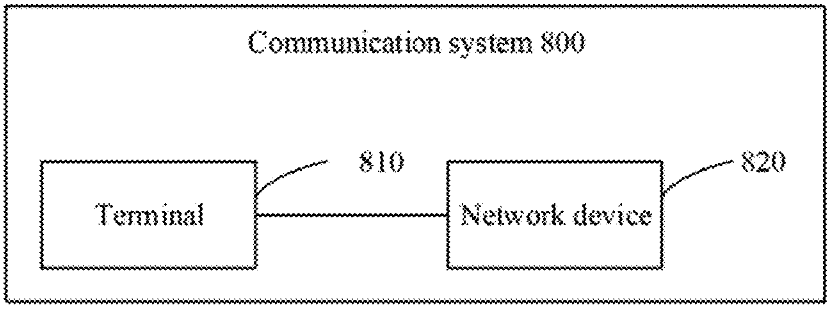
FIG. 27 is a block diagram of a communication system according to an embodiment of the present disclosure.

FIG. 27 is a schematic block diagram of a communication system 800 according to an embodiment of the present disclosure. The communication system 800 includes a terminal 810 and a network device 820.

The network device 820 sends a first signaling including respective feedback information corresponding to each resource unit in a first resource set.

Herein, the feedback information indicates whether the network device 820 correctly received, based on the resource unit corresponding to the feedback information, data transmitted by the terminal.

The terminal 810 receives the first signaling.

Herein, the terminal 810 may be used to implement the corresponding functions implemented by the terminal in the methods of various embodiments of the present disclosure, and the network device 820 may be used to implement the corresponding functions implemented by the network device in the methods of various embodiments of the present disclosure. It will not repeated herein for the sake of brevity The above embodiments may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, the processes or functions described according to embodiments of the present disclosure are generated in whole or in part. The computer may be a general purpose computer, a special purpose computer, a computer network, or other programmable apparatuses. The computer instructions may be stored in a computer-readable storage medium or transmitted from one computer-readable storage medium to another computer-readable storage medium. For example, the computer instructions may be transmitted from one Web site, computer, server, or data center by means of wired (e.g., coaxial cable, optical fiber, digital subscriber line (DSL)) or wireless (e.g., infrared, wireless, microwave) to another Web site, computer, server, or data center. The computer-readable storage medium may be any available medium accessible to a computer, or may be a data storage device including a server, data center, or the like integrated with one or more available media. The available media may be magnetic media (e.g., floppy disk, hard disk, magnetic tape), optical media (e.g., DVD), or semiconductor media (e.g., solid state disk (SSD)), or the like.

It should be understood that in various embodiments of the present disclosure, the size of the sequence number of the above processes does not mean the order of execution, and the execution order of each process should be determined according to its function and inherent logic, and should not constitute any limitation on the implementation of embodiments of the present disclosure.

Those skilled in the art will clearly appreciate that for convenience and brevity of description, specific operating processes of the above-described systems, apparatuses, and units may refer to corresponding processes in the foregoing method embodiments, and will not be repeated herein.

The above is only the specific implementation of the present disclosure, but the scope of protection of the present disclosure is not limited thereto. Any changes or substitutions, that may be easily thought of by those skilled familiar with the art within the technical scope disclosed by the present disclosure, should be covered within the scope of protection of the present disclosure. Therefore, the scope of protection of the present disclosure shall be subject to the scope of protection of the claims.

What is claimed is:

1. An information indication method, comprising:

receiving, by a terminal, from a network device, a first signaling comprising respective feedback information corresponding to each of a plurality of resource units in a first resource set, wherein the plurality of resource units are respectively used by a plurality of terminals comprising the terminal to transmit uplink data, wherein the respective feedback information corresponding to each resource unit indicates whether the network device, based on the resource unit, correctly received the uplink data transmitted by a terminal that used the resource unit among the plurality of terminals, and wherein the feedback information is acknowledgment information (ACK) or negative acknowledgement information (NACK).

2. The method of claim 1, further comprising:

determining, by the terminal, feedback information in the first signaling corresponding to a first resource unit in the first resource set, based on correspondences between each resource unit in the first resource set and each feedback information in the first signaling; and when the terminal transmits data based on the first resource unit in the first resource set, determining, by the terminal, whether the network device correctly received the uplink data based on the feedback information corresponding to the first resource unit in the first signaling.

3. The method of claim 1, wherein the respective feedback information corresponding to the each resource unit comprises a plurality pieces of feedback information that are in one-to-one correspondences with a plurality of codewords supported by the each resource unit; and each of the plurality pieces of feedback information indicates whether the network device correctly received the uplink data using a codeword corresponding to the feedback information from the terminal based on the resource unit corresponding to the feedback information.

4. The method of claim 3, further comprising:

determining, by the terminal, feedback information in the first signaling corresponding to a first resource unit in the first resource set and a first codeword, based on correspondences between each resource unit in the first resource set and each feedback information in the first signaling; and when the terminal transmits data using the first codeword based on the first resource unit in the first resource set, determining, by the terminal, whether the network device correctly received the uplink data based on the feedback information corresponding to the first resource unit and the first codeword in the first signaling.

5. The method of claim 1, wherein the first resource set is one of a plurality of resource sets configured by the network device or pre-configured for the terminal to transmit data, and the first signaling comprises respective feedback information corresponding to each resource unit in each of the plurality of resource sets.

6. The method of claim 1, further comprising:

determining, by the terminal, correspondences between the plurality of resource units in the first resource set and a plurality of pieces of feedback information in the first signaling based on a first mapping order;

wherein the first mapping order comprises a resource order comprising an order of time domain indexes of resource units in the first resource set and/or an order of frequency domain indexes of the resource units in the first resource set.

7. The method of claim 1, wherein the first resource set is one of a plurality of resource sets configured by the network device or pre-configured for the terminal to transmit data, and the first signaling is a signaling corresponding to the first resource set in a plurality of signalings sent by the network device, and wherein the plurality of signalings are in one-to-one correspondences with the plurality of resource sets.

8. A network device, comprising:

a transceiver;

a processor; and a memory for storing a computer program that, when executed by the processor, causes the processor to:

send, through the transceiver, to at least one terminal, a first signaling comprising respective feedback information corresponding to each of a plurality of resource units in a first resource set, wherein the plurality of resource units are respectively used by a plurality of terminals comprising the at least one terminal to transmit uplink data, wherein the respective feedback information corresponding to each resource unit indicates whether the network device, based on the resource unit, correctly received the uplink data transmitted by a terminal that used the resource unit among the plurality of terminals, and wherein the feedback information is acknowledgement information (ACK) or negative acknowledgement information (NACK).

9. The network device of claim 8, wherein the feedback information is the ACK when the feedback information comprises a first bit value;

the feedback information is the NACK when the feedback information comprises a second bit value.

10. The network device of claim 8, wherein the respective feedback information corresponding to the each resource unit comprises a plurality pieces of feedback information that are in one-to-one correspondences with a plurality of codewords supported by the each resource unit; and each of the plurality pieces of feedback information indicates whether the network device correctly received the uplink data using a codeword corresponding to the feedback information from the terminal based on the resource unit corresponding to the feedback information.

11. The network device of claim 8, wherein the first resource set is one of a plurality of resource sets configured by the network device or pre-configured for the terminal to transmit data; and the first signaling comprises respective feedback information corresponding to each resource unit in each of the plurality of resource sets, or the first signaling is a signaling corresponding to the first resource set in a plurality of signalings sent by the network device, wherein the plurality of signalings are in one-to-one correspondences with the plurality of resource sets.

12. The network device of claim 8, wherein the processor is further configured to:

determine correspondences between the plurality of resource units in the first resource set and a plurality of pieces of feedback information in the first signaling based on a first mapping order, wherein the first mapping order comprises a resource order comprising an order of time domain indexes of resource units in the first resource set and/or an order of frequency domain indexes of resource units in the first resource set.

13. A terminal, comprising:

a transceiver;

a processor; and a memory for storing a computer program that, when executed by the processor, causes the processor to:

receive, through the transceiver, from a network device, a first signaling comprising respective feedback information corresponding to each of a plurality of resource units in a first resource set, wherein the plurality of resource units are respectively used by a plurality of terminals comprising the terminal to transmit uplink data, wherein the respective feedback information corresponding to each resource unit indicates whether the network device, based on the resource unit, correctly received the uplink data transmitted by a terminal that used the resource unit among the plurality of terminals, wherein the feedback information is acknowledgment information (ACK) or negative acknowledgement information (NACK).

14. The terminal of claim 13, wherein the respective feedback information corresponding to the each resource unit comprises a plurality pieces of feedback information that are in one-to-one correspondences with a plurality of codewords supported by the each resource unit; and each of the plurality pieces of feedback information indicates whether the network device correctly received the uplink data using a codeword corresponding to the feedback information from the terminal based on the resource unit corresponding to the feedback information.

15. The terminal of claim 13, wherein the processor is further configured to:

determine correspondences between each resource unit in the first resource set and each feedback information in the first signaling based on a first mapping order, wherein the first mapping order comprises a resource order comprising an order of time domain indexes of resource units in the first resource set and/or an order of frequency domain indexes of the resource units in the first resource set.

16. The terminal of claim 15, wherein the first mapping order further comprises:

a codeword order, comprising an order of codeword indexes of a plurality of codewords supported by the each resource unit;

and/or, a set order, comprising an order of set indexes of a plurality of resource sets.

17. The terminal of claim 13, wherein the first resource set is one of a plurality of resource sets configured by the network device or pre-configured for the terminal to transmit data, and the first signaling is a signaling corresponding to the first resource set in a plurality of signalings sent by the network device, and wherein the plurality of signalings are in one-to-one correspondences with the plurality of resource sets.

18. The terminal of claim 17, wherein a sending time order of the plurality of signalings is related to a numbering order of the plurality of resource sets; and the processor is further configured to:

determine the first signaling corresponding to the first resource set in the plurality of signalings based on the sending time order of the plurality of signalings and the numbering order of the plurality of resource sets.

19. The terminal of claim 17, wherein scrambling codes or Radio Network Temporary Identities (RNTIs) for the plurality of signalings are in one-to-one correspondences with the plurality of resource sets; and the processor is further configured to:

determine the first signaling corresponding to the first resource set in the plurality of signalings based on a scrambling code or RNTI corresponding to the first resource set.

20. A chip, comprising:

a processor, configured to invoke and run a computer program from a memory to cause a terminal installed with the chip to receive, from a network device, a first signaling comprising respective feedback information corresponding to each of a plurality of resource units in a first resource set, wherein the plurality of resource units are respectively used by a plurality of terminals comprising the terminal to transmit uplink data, wherein the respective feedback information corresponding to each resource unit indicates whether the network device, based on the resource unit, correctly received the uplink data transmitted by a terminal that used the resource unit among the plurality of terminals, and wherein the feedback information is acknowledgment information (ACK) or negative acknowledgement information (NACK).

* * * * *